US009751011B2

(12) United States Patent
Harvey et al.

(10) Patent No.: US 9,751,011 B2
(45) Date of Patent: *Sep. 5, 2017

(54) SYSTEMS AND METHODS FOR A UNIFIED GAME EXPERIENCE IN A MULTIPLAYER GAME

(71) Applicant: Electronic Arts, Inc., Redwood City, CA (US)

(72) Inventors: Roy Harvey, Maitland, FL (US); Neil Do, Redwood City, CA (US)

(73) Assignee: ELECTRONICS ARTS, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,765

(22) Filed: May 24, 2013

(65) Prior Publication Data
US 2013/0326374 A1   Dec. 5, 2013

Related U.S. Application Data

(60) Provisional application No. 61/651,839, filed on May 25, 2012.

(51) Int. Cl.
*A63F 13/355* (2014.01)
*A63F 13/49* (2014.01)
(Continued)

(52) U.S. Cl.
CPC ............ *A63F 13/355* (2014.09); *A63F 13/49* (2014.09); *A63F 13/75* (2014.09); *A63F 13/822* (2014.09);
(Continued)

(58) Field of Classification Search
CPC .......... A63F 2300/535; A63F 2300/538; A63F 13/49; A63F 13/493
(Continued)

(56) References Cited

U.S. PATENT DOCUMENTS 5,558,339 A    9/1996  Perlman
5,850,352 A *  12/1998 Moezzi .................. H04N 5/222
                                                      345/419

(Continued)

OTHER PUBLICATIONS

Ito, "Asynch Queue," 2012, retrieved from http://search.cpan.org/~toshioito/Async-Queue0.021/lib/Async/Queue.pm.

*Primary Examiner* — Milap Shah
*Assistant Examiner* — Anh Vo V Nguyen
(74) *Attorney, Agent, or Firm* — McDermott Will & Emery LLP

(57) ABSTRACT

In some embodiments, a system comprises game state information, a first user device, a second user device, and a processing server. The first and second user devices may include a first and second user interface modules configured to receive first and second user selections, respectively, associated with gameplay of a multiplayer game. The processing server may include a communication module, a simulation module, and rendering module. The communication module may be configured to receive the first and second user selections. The simulation module may be configured to generate simulation results based on the game state information, game rules, and the first and second user selections. The rendering module may be configured to render a first video based on the simulation results and render a second video based on the simulation results, the first and second video to be displayed by the first and second user devices, respectively.

30 Claims, 14 Drawing Sheets

(51) Int. Cl.
*A63F 13/75* (2014.01)
*A63F 13/822* (2014.01)

(52) U.S. Cl.
CPC ... *A63F 2300/535* (2013.01); *A63F 2300/538* (2013.01); *A63F 2300/554* (2013.01)

(58) Field of Classification Search
USPC .......................................... 463/31; 715/756
See application file for complete search history.

(56) References Cited

U.S. PATENT DOCUMENTS

| | | | |
|---|---|---|---|
| 5,867,229 A * | 2/1999 | Stevens | G11B 27/034 348/722 |
| 5,890,963 A | 4/1999 | Yen | |
| 5,953,506 A | 9/1999 | Kalra et al. | |
| 6,508,711 B1 | 1/2003 | Ono | |
| 7,062,527 B1 * | 6/2006 | Tyrrell, III | G06F 9/5044 709/201 |
| 7,100,020 B1 | 8/2006 | Brightman et al. | |
| 8,171,461 B1 | 5/2012 | Kilgard et al. | |
| 8,187,100 B1 * | 5/2012 | Kahn et al. | 463/42 |
| 8,200,796 B1 | 6/2012 | Margulis | |
| 8,328,643 B1 | 12/2012 | Osvald et al. | |
| 8,341,550 B2 | 12/2012 | de Heer | |
| 8,366,546 B1 | 2/2013 | Naik et al. | |
| 8,435,121 B1 * | 5/2013 | Fisher et al. | 463/42 |
| 8,628,424 B1 | 1/2014 | Kern et al. | |
| 8,795,086 B2 | 8/2014 | Rudi et al. | |
| 8,922,631 B1 * | 12/2014 | Johnston | 348/56 |
| 9,043,800 B2 * | 5/2015 | Chanda | H04N 21/42607 718/103 |
| 2002/0015042 A1 * | 2/2002 | Robotham | G06F 3/14 345/581 |
| 2002/0137565 A1 * | 9/2002 | Blanco | 463/46 |
| 2003/0038805 A1 | 2/2003 | Wong et al. | |
| 2003/0043191 A1 * | 3/2003 | Tinsley | G06F 9/4443 715/762 |
| 2003/0220143 A1 | 11/2003 | Shteyn et al. | |
| 2004/0139159 A1 * | 7/2004 | Ricciardi et al. | 709/205 |
| 2004/0266529 A1 * | 12/2004 | Chatani | 463/40 |
| 2004/0267965 A1 * | 12/2004 | Vasudevan | G06F 17/30905 709/250 |
| 2006/0058103 A1 * | 3/2006 | Danieli | A63F 13/12 463/42 |
| 2006/0082583 A1 | 4/2006 | Leichtling et al. | |
| 2006/0105841 A1 | 5/2006 | Rom et al. | |
| 2006/0159166 A1 | 7/2006 | Mohsenian | |
| 2006/0230428 A1 * | 10/2006 | Craig et al. | 725/133 |
| 2006/0259579 A1 * | 11/2006 | Beverly | 709/217 |
| 2007/0030276 A1 | 2/2007 | MacInnis et al. | |
| 2007/0099694 A1 | 5/2007 | McCarthy et al. | |
| 2007/0117617 A1 | 5/2007 | Spanton et al. | |
| 2007/0117635 A1 | 5/2007 | Spanton et al. | |
| 2007/0143664 A1 | 6/2007 | Fang et al. | |
| 2007/0160961 A1 * | 7/2007 | Lum | A63F 13/10 434/29 |
| 2008/0119286 A1 | 5/2008 | Brunstetter et al. | |
| 2008/0125226 A1 | 5/2008 | Emmerson | |
| 2008/0146338 A1 | 6/2008 | Bernard et al. | |
| 2008/0207322 A1 * | 8/2008 | Mizrahi | A63F 13/12 463/32 |
| 2008/0242421 A1 * | 10/2008 | Geisner et al. | 463/42 |
| 2008/0268961 A1 * | 10/2008 | Brook et al. | 463/42 |
| 2008/0303835 A1 | 12/2008 | Swift et al. | |
| 2008/0303837 A1 | 12/2008 | Swift et al. | |
| 2008/0310018 A1 * | 12/2008 | Tripp | A63F 13/00 359/483.01 |
| 2009/0002379 A1 | 1/2009 | Baeza et al. | |
| 2009/0009605 A1 * | 1/2009 | Ortiz | H04N 5/232 348/157 |
| 2009/0027383 A1 | 1/2009 | Bakalash et al. | |
| 2009/0062016 A1 | 3/2009 | Assia et al. | |
| 2009/0115901 A1 * | 5/2009 | Winter | H04N 5/262 348/565 |
| 2009/0124387 A1 * | 5/2009 | Perlman et al. | 463/42 |
| 2009/0135190 A1 | 5/2009 | Bakalash et al. | |
| 2009/0189890 A1 | 7/2009 | Corbett et al. | |
| 2009/0199095 A1 * | 8/2009 | Nicol, II | G06F 3/0481 715/704 |
| 2009/0203449 A1 * | 8/2009 | Douceur et al. | 463/42 |
| 2009/0208181 A1 * | 8/2009 | Cottrell | A63F 13/497 386/278 |
| 2009/0222861 A1 * | 9/2009 | Edmark | G06Q 30/06 725/60 |
| 2009/0225076 A1 | 9/2009 | Vlietinck | |
| 2009/0265661 A1 | 10/2009 | Shuster | |
| 2009/0275414 A1 | 11/2009 | Lee et al. | |
| 2009/0315886 A1 * | 12/2009 | Drive | H04N 21/2405 345/428 |
| 2010/0020068 A1 * | 1/2010 | House | G06T 15/20 345/419 |
| 2010/0063992 A1 | 3/2010 | Ma et al. | |
| 2010/0079670 A1 * | 4/2010 | Frazier | H04N 5/44591 348/564 |
| 2010/0262710 A1 * | 10/2010 | Khatib | G11B 27/034 709/231 |
| 2010/0289804 A1 * | 11/2010 | Jackman | G06F 9/547 345/520 |
| 2010/0306813 A1 * | 12/2010 | Perry | A63F 13/10 725/114 |
| 2011/0122063 A1 | 5/2011 | Perlman et al. | |
| 2011/0126190 A1 | 5/2011 | Urbach | |
| 2011/0131510 A1 * | 6/2011 | DeLuca | A63F 13/12 715/757 |
| 2011/0221865 A1 | 9/2011 | Hyndman | |
| 2011/0263332 A1 * | 10/2011 | Mizrachi | 463/42 |
| 2011/0269535 A1 | 11/2011 | Kelly et al. | |
| 2011/0281645 A1 | 11/2011 | Wolfson et al. | |
| 2011/0300932 A1 * | 12/2011 | Henderson | 463/30 |
| 2012/0004026 A1 | 1/2012 | Vann | |
| 2012/0004039 A1 * | 1/2012 | Perry et al. | 463/42 |
| 2012/0004040 A1 * | 1/2012 | Pereira et al. | 463/42 |
| 2012/0005316 A1 | 1/2012 | Perry et al. | |
| 2012/0064976 A1 * | 3/2012 | Gault et al. | 463/42 |
| 2012/0079080 A1 * | 3/2012 | Pishevar | 709/220 |
| 2012/0084789 A1 | 4/2012 | Iorio | |
| 2012/0086630 A1 * | 4/2012 | Zhu et al. | 345/156 |
| 2012/0154510 A1 * | 6/2012 | Huitema | H04N 5/23222 348/14.03 |
| 2012/0194656 A1 * | 8/2012 | Killian | H04N 13/0438 348/56 |
| 2012/0266068 A1 * | 10/2012 | Ryman | G06F 3/0485 715/719 |
| 2012/0270652 A1 * | 10/2012 | Kim et al. | 463/32 |
| 2012/0283018 A1 * | 11/2012 | Berner et al. | 463/42 |
| 2012/0299938 A1 * | 11/2012 | Iwasaki | 345/501 |
| 2012/0317504 A1 * | 12/2012 | Patel | G06F 9/4443 715/762 |
| 2012/0327179 A1 * | 12/2012 | Watson | H04N 5/247 348/14.08 |
| 2013/0123004 A1 * | 5/2013 | Kruglick | 463/29 |
| 2013/0162781 A1 * | 6/2013 | Hubner | H04N 5/2224 348/47 |
| 2013/0205206 A1 * | 8/2013 | Hawver et al. | 715/704 |
| 2013/0210522 A1 * | 8/2013 | Dharmapurikar | 463/31 |
| 2013/0212396 A1 | 8/2013 | Tamma | |
| 2013/0268856 A1 | 10/2013 | Hejl, Jr. et al. | |
| 2013/0316832 A1 * | 11/2013 | Olofsson et al. | 463/42 |
| 2013/0324245 A1 | 12/2013 | Harvey et al. | |
| 2014/0018165 A1 | 1/2014 | Kern et al. | |
| 2014/0213363 A1 | 7/2014 | Harvey et al. | |

* cited by examiner

SYSTEMS AND METHODS FOR A UNIFIED GAME EXPERIENCE IN A MULTIPLAYER GAME

CROSS-REFERENCE TO RELATED APPLICATIONS

The present application claims benefit of and priority to U.S. Provisional Patent Application Ser. No. 61/651,839, filed May 25, 2012, entitled "Unified Game Experience Across Disparate Devices," which is incorporated by reference herein. This application incorporates by reference U.S. Nonprovisional patent application Ser. No. 13/611,506, filed Sep. 12, 2012, entitled "Distributed Realization of Digital Content," U.S. Provisional Patent Application Ser. No. 61/620,529, filed Apr. 5, 2012, entitled "Method For Distributed Realization of Digital Content," and U.S. Nonprovisional patent application Ser. No. 13/902,750, filed May 24, 2013, entitled "Systems and Methods for a Unified Game Experience."

BACKGROUND

1. Field of the Invention

The present invention generally relates to game interaction. More particularly, the invention relates to systems and methods for a unified game experience.

2. Description of Related Art

Recent advances in smart phones and tablets, as well set top boxes and so-called smart TVs, have increased the potential market as well as expanded consumer expectations for video games outside of the traditional PC or consumer game consoles. This increase in market size has benefited publishers with a potential growth in market share offset by growing expectations from consumers that a game will have the same visual fidelity no matter what the platform. With a wide degree of variation in CPU and GPU performance across these different platforms, game developers and publishers struggle to build the same visual accuracy and consumer experience for multiple different hardware experiences. Typically, this falls to developers who must spend additional time and resources, reworking program code, reworking visual assets, and sometimes even reworking game design to match each platform. This becomes doubly difficult in a scenario where users are pitted against each other in multiplayer games where their individual experiences on disparate devices may be so different that the verisimilitude of the experience is destroyed.

SUMMARY OF THE INVENTION

In some embodiments, a system comprises game state information, a first user device, a second user device, and a processing server. The first and second user devices may include a first and second user interface modules configured to receive first and second user selections, respectively, associated with gameplay of a multiplayer game. The second user device may include a second user interface module configured to receive a second user selection associated with gameplay of the multiplayer game. The processing server may include a communication module, a simulation module, and rendering module. The communication module may be configured to receive the first and second user selections from the first and second user devices, respectively. The simulation module may be configured to generate simulation results based on the game state information, game rules, and the first and second user selections. The rendering module may be configured to render a first video based on the simulation results and render a second video based on the simulation results, the first and second video to be displayed by the first and second user devices, respectively. In some embodiments, the rendering module is configured to render the first and/or second video based on simulation results and/or game display information.

The processing server may include the second rendering module. In some embodiments, the second user device includes the second rendering module. The game may be turn-based. In some embodiments, the first and second videos are similar. In other embodiments, the first and second videos have different perspectives.

In various embodiments, a system comprises game state information and a processing server. The processing server may include a communication module, a simulation module, and a second rendering module. The communication module may be configured to receive a user selection from a first user device. The first user device may include a user interface module, a simulation module, and a first rendering module. The user interface module may be configured to receive the user selection associated with gameplay of a game. The simulation module may be configured to generate simulation results based on the game state information, game rules, and the user selection. The first rendering module may be configured to render a first video based on the simulation results. The simulation module of the processing engine may be configured to generate a second instance of the simulation results based on the game state information, the game rules, and the user selection from the first user device. The second rendering module of the processing server may be configured to render a second video based on the second instance of the simulation results for display by a second user device. In some embodiments, the rendering module is configured to render the first and/or second video based on simulation results and/or game display information.

The processing server may include the second rendering module. In some embodiments, the second user device includes the second rendering module. The game may be turn-based. In some embodiments, the first and second videos are similar. In other embodiments, the first and second videos have different perspectives.

An exemplary method comprises receiving game state information, receiving, by a processing server, a user selection from a first user device, the first user device configured to receive the user selection associated with gameplay of a game, generate simulation results based on the game state information, game rules, and the user selection, and render first video based on the simulation results, generating, by the processing server, a second instance of the simulation results based on the game state information, the game rules, and the user selection from the first user device, and rendering a second video based on the second instance of the simulation results for display by a second user device. In some embodiments, the second video is based on the second instance of the simulation results and game display information.

The processing server may render the second video. In some embodiments, the second user device renders the second video. The game may be turn-based. In some embodiments, the first and second videos are similar. In other embodiments, the first and second videos have different perspectives.

An exemplary computer readable medium comprises instructions. The instructions may be executable by a processor for performing a method. The method may comprise receiving game state information, receiving, by a processing server, a user selection from a first user device, the first user device configured to receive the user selection associated with gameplay of a game, generate simulation results based on the game state information, game rules, and the user selection, and render first video based on the simulation results, generating, by the processing server, a second instance of the simulation results based on the game state information, the game rules, and the user selection from the first user device, and rendering a second video based on the second instance of the simulation results for display by a second user device. In some embodiments, the second video is based on the second instance of the simulation results and game display information.

The processing server may render the second video. The game may be turn-based. In some embodiments, the first and second videos are similar. In other embodiments, the first and second videos have different perspectives.

An exemplary system comprises game state information, a first user device, a second user device and a processing server. The first user device may include a first user interface module configured to receive a first user selection associated with gameplay of a multiplayer game. The second user device may include a second user interface module configured to receive a second user selection associated with gameplay of the multiplayer game. The processing server may include a communication module, a simulation module, and a rendering module. The communication module may be configured to receive the first and second user selections from the first and second user devices, respectively. The simulation module may be configured to generate simulation results based on the game state information, game rules, and the first and second user selections. The rendering module may be configured to render a first video based on the simulation results and render a second video based on the simulation results, the first and second video to be displayed by the first and second user devices, respectively.

In various embodiments, the rendering module may be configured to generate first game display information and second game display information based, in part, on the simulation results and device capability information regarding the first and/or second user devices. The rendering module may be further configured to provide the first and second game display information to the first and second user devices, respectively. The first game display information may comprise information to assist with local video and/or images rendering on the first user device. The second game display information may comprise information to assist with local video and/or images rendering on the second user device. In some embodiments, the first game display information comprises text, video, images, and/or information to assist in local rendering of text, video and/or images by the first user device. Similarly, in some embodiments, the second game display information comprises text, video, images, and/or information to assist in local rendering of text, video and/or images by the first user device.

In some embodiments, the first video is from a perspective of a first player associated with the first user device and the second video is from a perspective of a second player associated with the second user device. The game may be turn-based. The first and second videos may be similar. In some embodiments, the first user interface module is configured to receive the first user selection by displaying at least one menu to a first player based on the game state information and the game rules. The simulation module may be further configured to update the game state information. In some embodiments, the communication module of the processing server is further configured to provide the updated game state information to the first and second user devices. The first and second user interface modules of the first and second user devices may be further configured to generate a menu to receive user input based on the updated game state information and the game rules.

An exemplary system comprises game state information and a processing server. The processing server may comprise a communication module, a simulation module, and a rendering module. The communication module may be configured to receive a first and second user selection from first and second user devices, respectively. The first user device may include a first user interface module configured to receive the first user selection associated with gameplay of a multiplayer game. The second user device may include a second user interface module configured to receive the second user selection associated with gameplay of the multiplayer game. The simulation module of the processing server may be configured to generate simulation results based on the game state information, game rules, and the first and second user selections. The rendering module of the processing engine may be configured to render a first video based on the simulation results and render a second video based on the simulation results, the first and second video to be displayed by the first and second user devices, respectively.

In various embodiments, the rendering module may be configured to generate first game display information and second game display information based, in part, on the simulation results and device capability information regarding the first and/or second user devices. The rendering module may be further configured to provide the first and second game display information to the first and second user devices, respectively. The first game display information may comprise information to assist with local video and/or images rendering on the first user device. The second game display information may comprise information to assist with local video and/or images rendering on the second user device. In some embodiments, the first game display information comprises text, video, images, and/or information to assist in local rendering of text, video and/or images by the first user device. Similarly, in some embodiments, the second game display information comprises text, video, images, and/or information to assist in local rendering of text, video and/or images by the first user device.

In some embodiments, the first video is from a perspective of a first player associated with the first user device and the second video is from a perspective of a second player associated with the second user device. The game may be turn-based. The first and second videos may be similar. In some embodiments, the first user interface module is configured to receive the first user selection by displaying at least one menu to a first player based on the game state information and the game rules. The simulation module may be further configured to update the game state information. In some embodiments, the communication module of the processing server is further configured to provide the updated game state information to the first and second user devices. The first and second user interface modules of the first and second user devices may be further configured to generate a menu to receive user input based on the updated game state information and the game rules.

An exemplary method comprises receiving game state information, receiving, by a processing server, a first and second user selections from a first and second user devices, respectively, the first user device configured to receive the first user selection associated with gameplay of a multiplayer game, the second user device configured to receive the second user selection associated with gameplay of the multiplayer game, generating, by the processing server, simulation results based on the game state information, game rules, and the first and second user selections, rendering, by the processing server, a first video based on the simulation results, the first video to be displayed by the first user device, and rendering, by the processing server, a second video based on the simulation results, the second video to be displayed by the second user device.

In various embodiments, the method further comprises generating first game display information and second game display information based, in part, on the simulation results and device capability information regarding the first and/or second user devices. The method may also comprise providing the first and second game display information to the first and second user devices, respectively. The first game display information may comprise information to assist with local video and/or images rendering on the first user device. The second game display information may comprise information to assist with local video and/or images rendering on the second user device. In some embodiments, the first game display information comprises text, video, images, and/or information to assist in local rendering of text, video and/or images by the first user device. Similarly, in some embodiments, the second game display information comprises text, video, images, and/or information to assist in local rendering of text, video and/or images by the first user device.

In some embodiments, the first video is from a perspective of a first player associated with the first user device and the second video is from a perspective of a second player associated with the second user device. The game may be turn-based. The first and second videos may be similar.

The method may further comprise updating, by the processing module, the game state information. The method may also further comprise providing, by the processing server, the updated game state information to the first and second user devices. In some embodiments, the first and second user devices are further configured to generate a menus, respectively, to receive user input based on the updated game state information and the game rules.

An exemplary computer readable medium comprises instructions. The instructions may be executable by a processor for performing a method. The method may comprise receiving game state information, receiving, by a processing server, a first and second user selections from a first and second user devices, respectively, the first user device configured to receive the first user selection associated with gameplay of a multiplayer game, the second user device configured to receive the second user selection associated with gameplay of the multiplayer game, generating, by the processing server, simulation results based on the game state information, game rules, and the first and second user selections, rendering, by the processing server, a first video based on the simulation results, the first video to be displayed by the first user device, and rendering, by the processing server, a second video based on the simulation results, the second video to be displayed by the second user device.

In various embodiments, the method further comprises generating first game display information and second game display information based, in part, on the simulation results and device capability information regarding the first and/or second user devices. The method may also comprise providing the first and second game display information to the first and second user devices, respectively. The first game display information may comprise information to assist with local video and/or images rendering on the first user device. The second game display information may comprise information to assist with local video and/or images rendering on the second user device. In some embodiments, the first game display information comprises text, video, images, and/or information to assist in local rendering of text, video and/or images by the first user device. Similarly, in some embodiments, the second game display information comprises text, video, images, and/or information to assist in local rendering of text, video and/or images by the first user device.

In some embodiments, the first video is from a perspective of a first player associated with the first user device and the second video is from a perspective of a second player associated with the second user device. The game may be turn-based. The first and second videos may be similar.

The method may further comprise updating, by the processing module, the game state information. The method may also further comprise providing, by the processing server, the updated game state information to the first and second user devices. In some embodiments, the first and second user devices are further configured to generate a menus, respectively, to receive user input based on the updated game state information and the game rules.

DETAILED DESCRIPTION OF THE INVENTION

Figure 1:
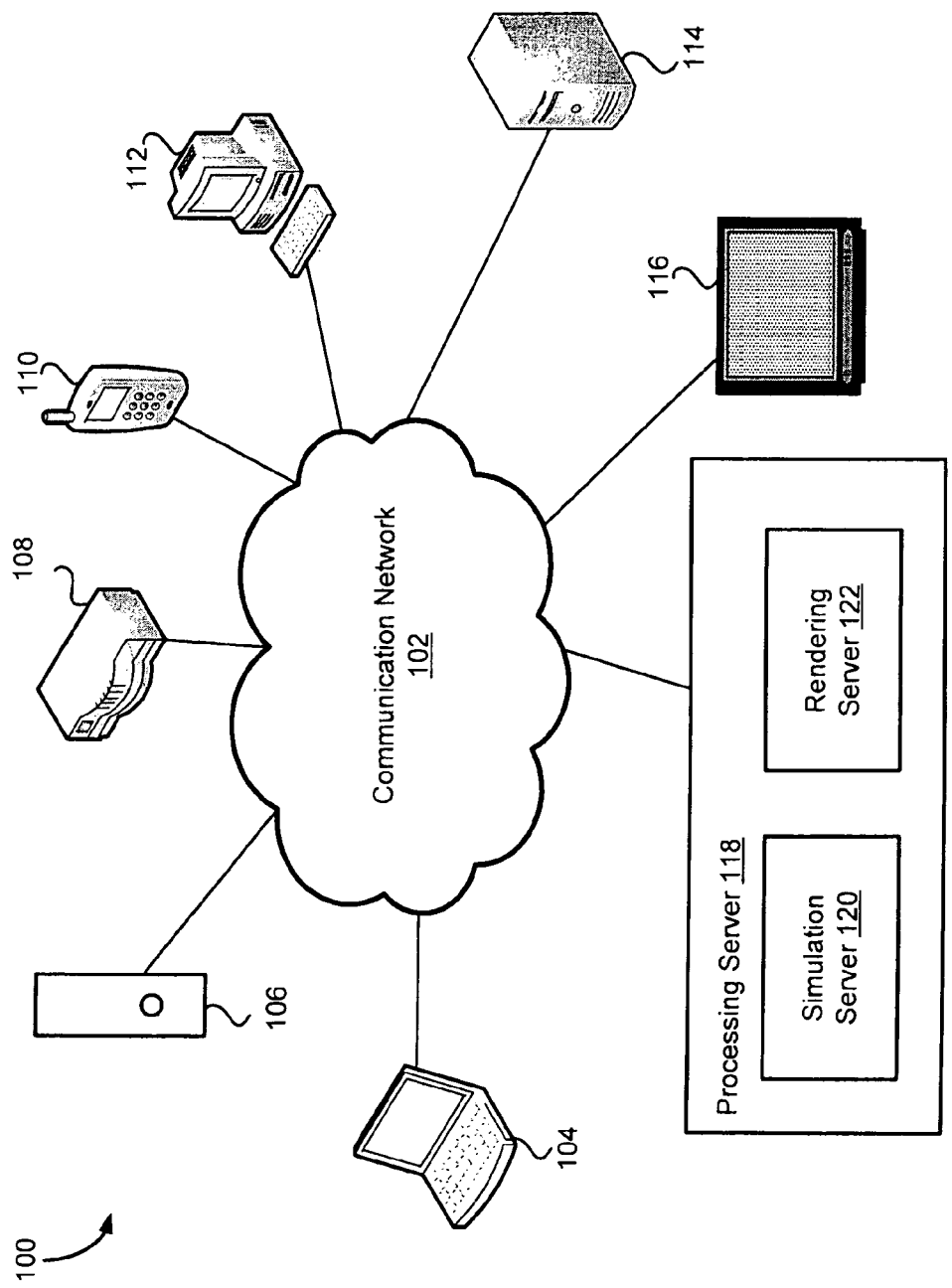
FIG. 1 is a block diagram of different user devices which may engage in one or more games in some embodiments.

Typically, video game devices such as consoles (e.g., XBOX) receive user input from a controller, simulate a game result based on the input and a state of the currently active game (i.e., the current game state), render video and/or images associated with the simulated result, and display the video and/or images on a screen (e.g., television screen). Those skilled in the art will appreciate that both simulation and rendering requires resources.

In various embodiments, one or more processes including, for example, receiving user input, simulating, and/or rendering video and/or images associated with the simulated result may be performed on different digital devices. A digital device is any device with memory and a processor.

In various embodiments, a local user device may generate a user interface for a game (e.g., based on game rules and a current game state) and receive user input. The simulation phase (i.e., the simulation of a game result based on the input and based on the state of the currently active game) may be performed by a different digital device in communication with the local user device. Further, the rendering phase (i.e., the rendering of video and/or images associated with the simulated result) may be performed on yet another digital device in communication with the local user device.

By splitting the functions of receiving user input, the simulation phase, and/or the rendering phase, resources on the local user device may be conserved while options for streaming video to multiple users and/or multiple-device play may be expanded. For example, a local user may input a selection in a local user device. The selection and/or current game state may be shared with a server that may perform the simulation. Rendering based on the simulation result may be performed by the same server or a different server (e.g., a plurality of digital devices). A server that performs rendering may provide different renderings of the simulation result including multiple viewpoints, multiple perspectives, multiple resolutions, and/or at multiple dimensions (e.g., depending on hardware requirements of the user device which is to display a rendering). The rendering(s) could be provided back to the local user device and/or shared with one or more remote users with other remote user devices.

In some embodiments, game play is deterministic. A deterministic game is a game with game rules that will produce the same simulation given the same inputs (e.g., user selections and current game state). Game rules include executable instructions that control gameplay and/or the simulation. Multiple simulations of a deterministic game utilizing the same input and the same game state may provide the same simulation result. The deterministic nature of game play in these embodiments may allow for simulation and rendering on multiple devices without impacting local game device resources.

For example, a local user device may receive input from a user, simulate a result based on the received input and the current game state, render the simulation result, and display the output of the rendering. The local video game device may also provide the input from the user and/or the current game state to a processing server that may also perform a simulation that generates the same simulation result as the local user device. Further, like the local user device, the processing server may render the simulation result and provide the output of the rendering and/or stream video and/or audio based on the rendering to other digital devices. Those skilled in the art will appreciate that the local video game device may perform the simulation, rendering or neither. Similarly, the processing server may perform the simulation, rendering, or neither.

In one example, a deterministic game may be turn-based. A turn-based game may receive selections from a player (in a single player game) or multiple players (in a multiplayer game). Subsequently, a simulation is performed to generate a simulation result. The simulation may be based on the game rules (e.g., that govern the simulation) as well as the user selection(s) and the current game state. The simulation result may be rendered and displayed to the player(s) and the current game state may be updated based on the simulation result. The player(s) may then receive another turn whereby additional selection(s) may be made. Choices may be dictated by the game rules and the updated current game state. Examples of turn-based games include, but are not limited to, sports games such as football, baseball, or the like.

By splitting simulation and/or rendering from the functions receiving user input for gameplay, options for rendering multiple videos from the same simulation result become available. In one example, multiple videos of different perspectives and/or viewpoints of the same game may be rendered without impacting a player's local resources. Further, when a game is deterministic, players have the option of retrieving saved game states to replay the same game or explore possibilities (e.g., "what would have happened") if different choices were made.

Those skilled in the art will appreciate that, utilizing at least one or more of the systems and methods described herein, a player may play the same game on multiple devices thereby allowing the player to better engage in the experience. For example, a player may play a football game on their home personal computer (PC). The player may play a first down by selecting options based on the current game state of the football game. Once committing the selection, the PC may simulate the results based on the player's selected options and the current game state. The PC may subsequently render and display the simulated result. The PC may then generate a new game play state.

In some embodiments, the player may pause play, log out of the PC, and log back into the game utilizing a different digital device (e.g., a smartphone). When the player logs out or otherwise provides permission, the PC may provide the new game play state to a processing server over a network. When the player logs back into the game utilizing a different digital device, the processing server may recognize the different digital device (e.g., via authentication during login) and receive a request to continue playing the game. The processing engine may, in some embodiments, provide the new game play state to the different digital device, perform simulation, and/or rendering for the different digital device. As a result, the player may begin playing the game right where they left off in game play.

In a typical video game scenario, a number of parameters (i.e., game state conditions) are saved which dictate controlling the conditions for the way the game simulation will act. Game invocation typically comprises a loop 100 (see FIG. 1).

FIG. 1 is a block diagram 100 of different user devices 104, 106, 108, 110, 112, 114, and 116 which may engage in one or more games in some embodiments. Each user device 104, 106, 108, 110, 112, 114, or 116 may be a digital device that communicates over communication network 102. A digital device is any device with a processor and memory. Although seven different user devices are depicted in FIG. 1, those skill in the art will appreciate that there may be any number of user devices that are coupled to any number of networks. Various examples are displayed in FIG. 1 which is not intended to be exhaustive.

While many user devices on which to play games are different, they may share some common characteristics. The user devices may have some method of capturing user input such as a keyboard, remote control, touchscreen, or the like. Different user devices may also have some method of displaying a two-dimensional image using a display such as a TV screen (e.g., LED, LCD, or OLED) or touchscreen. The user devices may have some form of processing CPU, although the capability often widely varies in terms of capability and performance. Further, the user devices may have a connection to the internet, such as an Ethernet connection, WiFi connection or mobile phone cell data connection. In addition, using the combination of the two-dimensional image display and processing capability, the user devices may be able to receive and display video imagery and either by downloading a file or by streaming image data in or near real-time from a remote streaming server. In some embodiments, presented is a way that multiple users can interact with a game and receive the same experience as every other player regardless of their individual platform.

In various embodiments, one or more players may utilize each user device to play one or more games (e.g., a turn-based game). Each user device 104, 106, 108, 110, 112, 114, and 116 may display a user interface associated with the desired game. The user interface may be configured to receive user selections (e.g., user input) for game play. For example, there may be any number of menus that provide opportunity for player selection via buttons, radio buttons, check boxes, sliders, text fields, selectable objects, moveable objects, and/or the like.

The content of the user interface may be generated and/or selected based on the game rules as well as the current game state. Game rules and the current game state may dictate options from which the player may choose.

Once the player provides selection(s), in some embodiments, a simulation may be performed to determine the result of the player selection(s) in the context of game play (e.g., utilizing the current game state). In some embodiments, the simulation is conducted locally (e.g., a player utilizing user device 106 inputs selection(s) and the user device 106 performs the simulation) based on the game rules. In various embodiments, the simulation may be performed by another digital device. For example, the user device 106 may provide the selection(s) and/or the current game state to the processing server 118 via the communication network 102. The simulation server 120 may perform the simulation based game rules, the player selection(s), and the current game state. In various embodiments, the simulation server 120 and/or any digital device may provide the selection(s) and/or current game state to any digital device which may perform the simulation.

Once the simulation is complete, the simulation result may be rendered. The simulation result from any of user devices 104, 106, 108, 110, 112, 114, or 116 or the processing server 118 may be rendered by any digital device. In some embodiments, the rendering server 122 renders the simulation result from the simulation server 120. The video and/or images from the rendering may be displayed on one or more of the user devices 104, 106, 108, 110, 112, 114, and/or 116.

In some embodiments, the rendering server 122 may stream and/or download video and/or images based on one or more renderings of the simulation result. For example, the rendering server 122 may broadcast the same video and/or images to one or more of the user devices. In another example, the rendering server 122 may perform multiple renderings of the same simulation result from different viewpoints and provide video and/or audio to different user devices. Renderings of the same simulation result may include video and/or audio which depict different views of the same gameplay.

In various embodiments, the rendering server 122 may provide game display information to the user devices 104, 106, 108, 110, 112, 114, and/or 116 to assist in rendering the simulation result. Game display information may include any information that may assist the receiving device to display information to a user (e.g., by providing the user device text, video, or images) or may assist the receiving device to render video and/or images. In one example, the game display information may be text (e.g., a text message) that may be displayed as a part of the game (e.g., scrolling text). In another example, the game display information may comprise vector and quaternion data for device specific rendering of results. In still other examples, the game display information may include position data (e.g., of players on a field), statistics of players, how scores are made, play by play information or the like. The position data, statistics, information on scores, and/or play by play information may be utilized by the receiving user device to display (e.g., render video or display text) all or part of the simulation result. Game display information may comprise video and/or images rendered by the rendering server 122.

In some embodiments, game display information is any information that assists a user device to render gameplay and/or includes rendered video and/or images. For example, game display information may comprise position data of players on a field, statistics of players, how the players scored, play by play information, or the like. All or some of the game display information may be utilized by the receiving user device to render game play (e.g., render text, video, or images). For example, the user device may render video of football players completing a play based on the simulation result and play by play information of the game display information. Those skilled in the art will appreciate that the game display information may be any information including previously rendered video and/or images or information that may be displayed by a user device or any information that assists in the local rendering of video and/or images.

User device 104 may include any laptop, notebook, ultrabook, tablet, or the like. User device 106 may include any console device such as Microsoft Xbox or Sony Playstation. The user device 106 may include hand-held gaming devices such as the Nintendo DS. User device 108 includes any smart media device (e.g., streaming device) that may, for example, be coupled to a television including, for example, Apple TV, Roku, SlingBox, Boxee Box, or the like.

User device 110 may include any smart phone, cell phone, PDA, tablet, wearable digital device (e.g., smartwatch or Google Glasses), media device (e.g., iPod), or the like. User device 112 includes any computer such as a personal computer, desktop computer, mainframe, or the like. User device 112 may include any digital device, for example, that plays one or more games over a browser. User device 114 includes any server or the like. User device 116 includes any television or smart television (e.g., portable or nonportable). Those skilled in the art will appreciate that the user devices may comprise any number of digital devices.

Communication network 102 may include any network or combination of networks. In some embodiments, the communication network 102 comprises the Internet. The communication network 102 may include any number of wide area networks (WANs), local area networks (LANs), or the like. All or part of the communication network 102 may be wireless or wired. For example, any number of the user devices may communicate wirelessly via the communication network 102.

Processing server 118 is any digital device that comprises a simulation server 120 and a rendering server 122. The simulation server 120 may receive user input (e.g., game selections from a user) and/or a current game state to simulate a game result (i.e., a simulation result). The rendering server 122 may receive the simulation result and render the video and/or images based on the simulation result. Video and/or images based on the rendering(s) may be provided to any number of user devices.

Although the processing server 118 is depicted as encompassing both the simulations server 120 and the rendering server 122, those skilled in the art will appreciate that the processing server 118 may, in some embodiments, include the simulation server 120 or the rendering server 122. For example, the simulation server 120 of the processing server 118 may communicate with the rendering server 122 of a different processing server 118. In various embodiments, the simulation server 120 and/or the rendering server 122 are independent servers on different digital devices.

Those skilled in the art will appreciate that a server may include any number of digital devices. For example, the processing server 118 may comprise any number of servers. Similarly, the simulation server 120 may be any number of servers. For example, the simulation server 120 may comprise any number of servers in communication over a network such as the cloud. Similarly, the rendering server 122 may be any number of servers. For example, the rendering server 122 may comprise any number of servers in communication over the network (e.g., the cloud).

Figure 2:
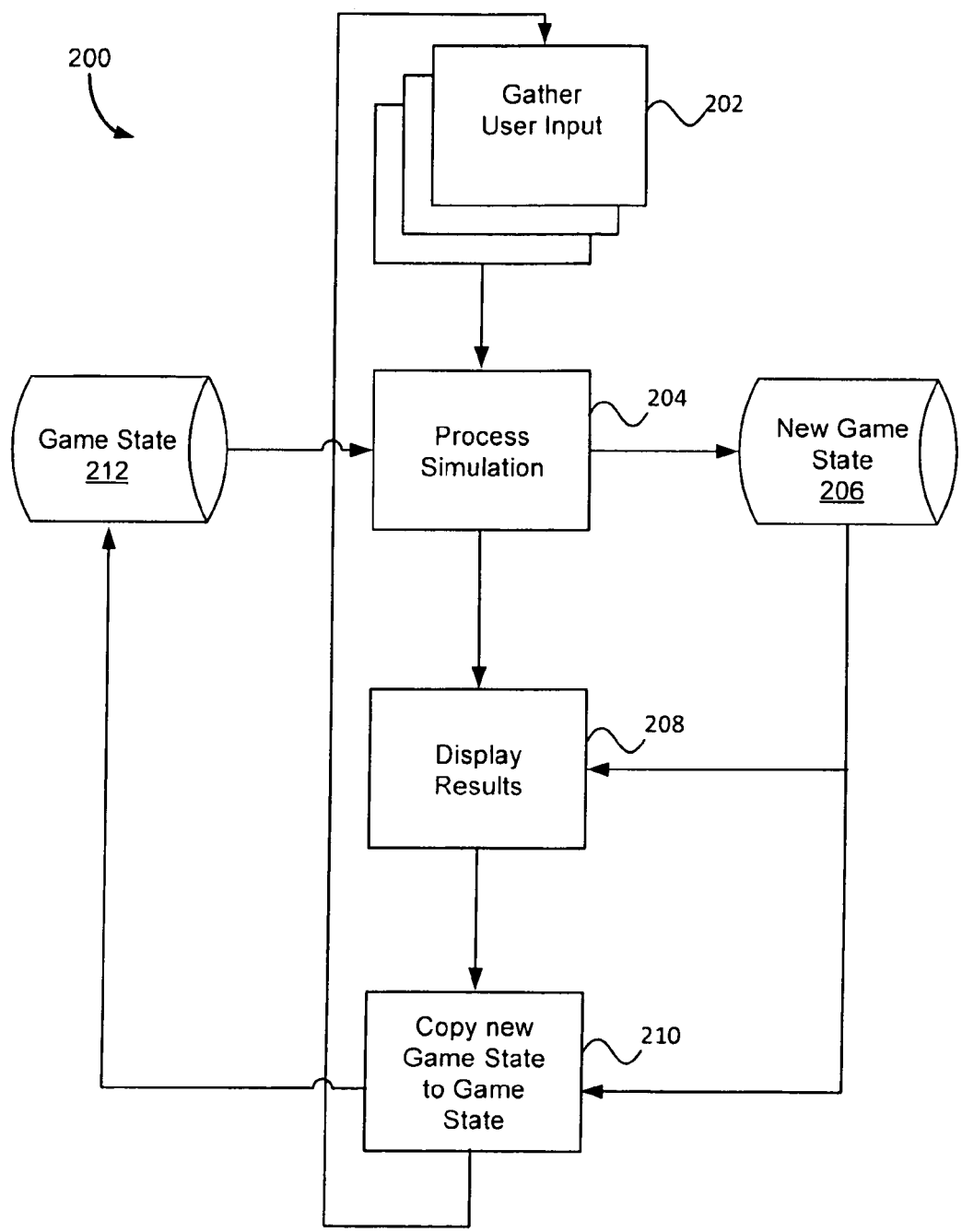
FIG. 2 is a flowchart of a game simulation and rendering process in some embodiments.

FIG. 2 is a flowchart 200 of a game simulation and rendering process in some embodiments. In step 202, input from one or more users (where a user may be a local player with a direct connection with the game or a remote player connected using some form of network such as an Ethernet connection) is gathered. For example, multiple players via different user devices (e.g., user devices 104, 106, 108, 110, 112, 114, and/or 116) may log into the processing server 118 to engage in a multiplayer game. Each of the different user devices may display user interfaces to the players to receive user input (e.g., to receive user selections during the player's turn). All or some of the user inputs may be provided to the processing server 118.

The processing server 118 may maintain a current game state or, in some embodiments, the current game state may be provided to the processing server 118 from one or more other digital devices (e.g., user devices 104, 106, 108, 110, 112, 114, and/or 116). A game state includes those parameters, values, and other indicators which may be used to describe the game at a point in time. In various embodiments, the game state may include the state of many game processes, programs, and the like that may be used to control game play.

In step 204, user input as well as the current game state 212 (i.e., current game state conditions) are applied to a simulation. In some embodiments, the simulation server 120 of the processing server 118 may receive the user inputs (e.g., game selection(s)) from one or more of the user devices as well as the current game state 212. The simulation server 120 may simulate the game play result based on the user inputs, the current game state, and game rules. The simulation server 120 may generate a simulation result based on the simulation as well as a new game state (e.g., an updated current game state based on the simulation).

The current game state may be modified according to the output of that simulation (see New Game State 206). In various embodiments, the simulation server 120 maintains the new game state 206 (e.g., the modified game state) and/or provides the new (e.g., updated) game state 206 to one or more other digital devices (e.g., user devices 104, 106, 108, 110, 112, 114, and/or 116).

In step 208, video and/or images are displayed using the updated game state 206 and/or the output of the simulation to display the results to the users. In some embodiments, the rendering server 122 renders the video and/or images based on the simulation result of step 204 (e.g., the simulation result from the simulation server 120). The rendering server 122 may also render the video and/or images based on the updated game state 206 (e.g., the new game state).

In various embodiments, the rendering server 122 may render different video and/or images of the same simulation result but from different camera angles and/or viewpoints. In some embodiments, the processing server 118 and/or the rendering server 122 track the viewpoints and/or preferred angles of different players. The rendering server 122 may render the viewpoints and/or preferred angles and provide the appropriate rendered view and/or images at the different viewpoints and/or preferred angles to the correct user device(s). In some embodiments, multiple players may receive the same view (e.g., the same rendered video and/or images). For example, the rendering server 122 may broadcast the same rendered video and/or images to different user devices. The rendering server 122 may perform multiple renderings and provide each rendered video to a different digital device. Those skilled in the art will appreciate that the rendering server 122 may comprise a cluster of digital devices capable of rendering multiple videos and/or images to provide to any number of user devices without consuming resources of the user devices.

In some embodiments, the rendering server 122 provides game display information to one or more different user devices. The game display information may comprise rendered video and/or images or information to assist in the rendering of video and/or images. In some embodiments, a first user device and a second user device involved in playing the same game (e.g., as opposing sides in a football game) may receive similar game display information from the rendering server 122 to assist in local rendering. The first and second user devices may each, independently of the other, render all or some of the video based on the game display information. For example, the first user device may receive play by play information which may be utilized to render video from the first player's perspective of a game. The second user device may receive the same information, more information, or different information (e.g., vector information) to assist in the rendering of video and/or images from the second player's perspective.

In step 210, the processing server 118 may optionally copy the new game state 206. For example, the new game state 206 may become the current game state 212. Subsequently, user inputs may again be received based on the new game state, the simulation processed, and game rules.

Figure 3:
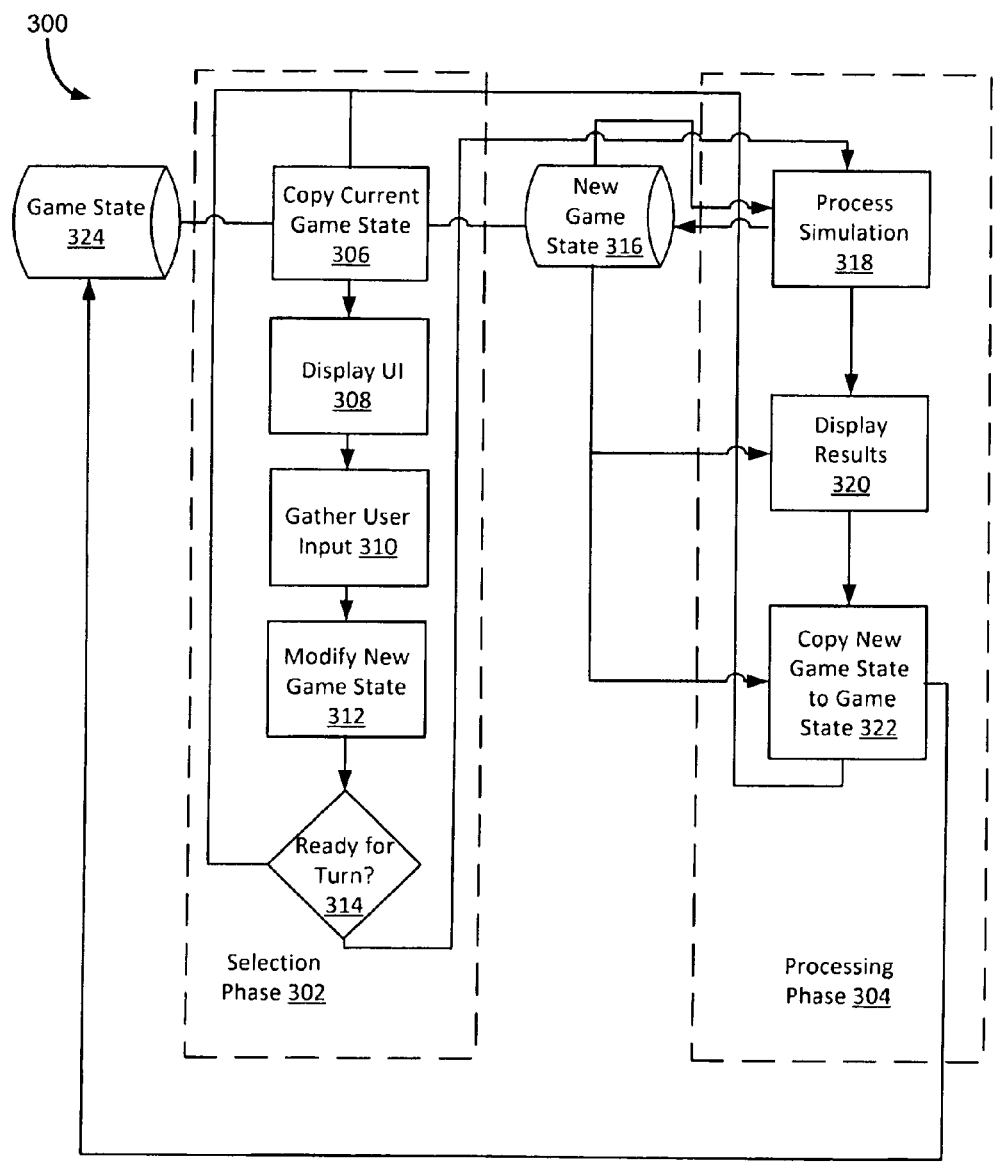
FIG. 3 is a flowchart depicting a selection phase and a processing phase for game simulation and rendering in some embodiments.

FIG. 3 is a flowchart 300 depicting a selection phase 302 and a processing phase 304 for game simulation and rendering in some embodiments. For some classes of games, game invocation can be thought of as comprising two phases including a selection phase 302 and a processing phase 304. The selection phase 302 may comprise comparatively light use of processing resources and may comprise one or more user interface (UI) screens on a digital device allowing the user to set up a number of variables that will be used in the processing phase 304. The selection phase 302 may have simpler graphics than the processing phase 304 and, as a result, may require fewer resources such as a GPU. In some embodiments, the processing phase 304, takes inputs from play selection from players, runs the simulation, and renders the results, often in a high fidelity manner. Typically, the processing phase 304 consumes more processing power than the selection phase 302 as the system renders a lot of information as well as run simulations.

In various embodiments, elements of FIG. 2 are decoupled such that parts may be handled using the player's local user device (e.g., user devices 104, 106, 108, 110, 112, 114, and/or 116) and parts may be handled by a remote computing device, such as a cloud computing resource (e.g., processing server 118), seamlessly to the user, which may result in improved visual fidelity as well as a unified experience for any number of different user devices.

In one example, parts of the game loop are decoupled such that the local user device still handles the selection phase, but the output from the selection phase 302 is sent to a remote computing device (e.g., processing server 118) which holds the game state, performs the processing part of the loop (e.g., performs the simulation), and then generates (e.g., renders) an output stream which is sent back to the users local devices for display. For example, in a football management game, gathering user input would include displaying options for a user to choose a play, feeding that play in to a simulation engine which evaluates the user play against the opponents chosen play and displaying the results of the play as a rendered video.

In various embodiments, the game captures the player's input locally, but instead of processing, the user's input is sent to the remote computing device where the current game state and the user's input is processed through the game simulation. At the completion of the simulation, the remote computing device may render the game output and transmit the output back to the user local device where the output is displayed (e.g., as video). If the game play simulation engine is considered to be deterministic (i.e., given the same user input and starting game state, the end game state and output result will always be the same), by saving the user input as well as the game conditions as a user state, the simulation result and/or game state can be processed and rendered at any point in time. Since the processing of the game is effectively decoupled from both the user input as well as the rendering to the output display, the user state can be rendered multiple times at different resolutions, camera angles, etc., with no loss of the original user intention.

In step 306 of selection phase 302, a copy of the current game state 324 is received or generated by a local user device (e.g., user device 104). The current game state 324 may be received from the processing server 118 or any digital device. In some embodiments, the current game state 324 may be retrieved from game rules or updated by the local user device.

In step 308, the local user device displays one or more user interface(s) to inform the player of the state of the game, provide instructions, and/or request selections (e.g., input) from the player. The local user device may generate or the one or more user interface(s). In some embodiments, the local user device may download and/or receive a stream to display one or more of the user interface(s).

In step 310, the local user device gathers user input (e.g., player selection(s)). The local user device may collect user input in any number of ways. In some embodiments, when the user makes selections and/or provides inputs, a game state is modified and/or new user interfaces are provided to request additional information from the player. In some examples, choices by a player may result in additional or different options that were not previously available.

In some embodiments, the local user device detects when sufficient user input is collected. In various embodiments, the local user device or a game on the local user device may receive a command from the player indicating that the simulation is to be performed based, at least in part, upon the received user inputs (e.g., without waiting or requesting additional user input). In some embodiments, the local user device may detect when sufficient user input is collected based on game rules.

In various embodiments, once sufficient user input is collected, the local user device may modify a new game state by applying all or part of the inputs to the previous game state. For example, a current game state may be modified based on the user input. In some embodiments, the results of a simulation are based on user inputs and a current game state. In various embodiments, the results of the simulation are based on, at least in part, on the new game state (e.g., the application of all or some of the user inputs to the current game state).

In step 314, the game and/or the player indicates readiness for a turn. In some embodiments, the player may indicate a desire to add additional selections or change previous choices. In this example, the previous game state may be restored and/or previous user interfaces may be provided to the player to make additional or different choices. If the player indicates readiness for a turn or simulation to occur, the processing phase 304 may process the simulation in step 318.

In some embodiments, once the player and/or a game indicates a readiness for a turn in step 314, a local user device may provide the user inputs and/or a current game state to the processing server 118 to perform the simulation and rendering. In some embodiments, the local user device may modify a new game state based at least in part on the user inputs. The local user device may subsequently provide the new game state, the user inputs, and/or the previous game state to the processing server 118 to perform the simulation.

The simulation of step 318 may be based on the game rules, user inputs (e.g., player selections), a modified new game state, and/or the previous game state. The simulation may depend on the game (e.g., the rules for the simulation) as well as the new game state, the user inputs, and/or the previous game state. The simulation server 120 may perform the simulation.

In step 320, the rendering server 122 of the processing server 118 may render the video and/or images based on the results of the simulation in step 318. In some embodiments, the rendering may also be based on the game rules, new game state, the user inputs, and/or the previous game state. The rendering server 122 may stream or otherwise provide the results of the rendering to the user device which may display the rendered video and/or images.

In step 322, the game state 316 is updated based on the simulation results, new game state, the user inputs, game rules, and/or the previous game state 324. The new game state may be provided to the user device. Based on the new game state, the user device may generate different user interfaces to receive different user inputs. The updated game state may also be saved by the processing server 118 to be used in the next simulation and/or rendering.

In some situations, such as consumer game consoles, it may be desirable to allow the user to interact with the game simulation in real time but save user states at significant points for later processing and rendering. In this mode, a user device such as a console (e.g., user device 106) may be capable of running the same game simulation which is run on a remote computing device (e.g., the processing server 118). In this example, a give user state for the user device may generate the same output when run on a remote computing device. This could, for example, allow a different user at a different user device to view a game in progress in near real time without affecting the connectivity or processing capability of the initial user device running the game.

In some embodiments, a further benefit is that, by virtue of the very small size of a user state (input plus game state), compression may be achieved that is greater than the equivalent video output. In addition, the rendering capabilities of the rendering server 122 may improve over time.

In some embodiments, rather than the output stream comprising encoded video of common format such as H264, the output stream (e.g., the game display information) could comprise a scene graph of 3D commands tailored to the specific graphics system of the local user device. This may require the remote computing device to have some information about the GPU of the local user device. By providing the user's local device with a 3D scene graph, rather than a 2D rendered video, the user may optionally view the result from different camera angles, or choose to remove or highlight one or more elements of the output.

Some embodiments allow for multiuser play. For example, the inputs from several users are used as input for the game logic and the game simulation. The display rendering may involve the same scene for each player or may be different scenes for one or more players (i.e. rendered from each player's point of view). In additional, multiple views may be rendered and each player may select the view they want before receiving the video output.

In some embodiments, user states may contain everything needed to render a scene. As a result, in various embodiments, we can also choose to use them in a number of ways unrelated to direct user input. For instance, a virtual TV channel may runs video highlights from multiple users for broadcast. In some embodiments, the user state for multiple different users may be used to render video and/or images sequentially and edit the video and/or images together to make a highlight reel. In various embodiments, users may replay scenarios starting with a user state but modifying one or more game parameters to achieve a different goal. For instance, in a football game, a user may choose to run a user state where the original set of inputs ended in a touchdown but change the defensive play to a different one to see if they can stop the touchdown.

In various embodiments, the processing server 118 (aka "SkyCam") may include an advanced simulation engine (which performs the simulation processing discussed above) and an HD rendering engine (which performs the rendering discussed above). The advanced simulation engine may comprise the simulation server 120. The HD rendering engine may comprise the rendering server 122. The processing engine 118 may be communicatively coupled to disparate devices including servers, other simulators (e.g., an on-demand fantasy simulator for a sports game), consoles, web browsers, mobile devices, set-top boxes and smart TVs as shown in FIG. 1.

In one example of operation in a video game such as a sports game where players can be members of virtual leagues, devices such as consoles can provide instant highlights, news and simulation from game play. Mobile devices can allow players to play connected careers anytime, anywhere with anyone. Season scrapbooks can be created for every game the player has ever played by storing historical game play data associated with a user.

Figure 4:
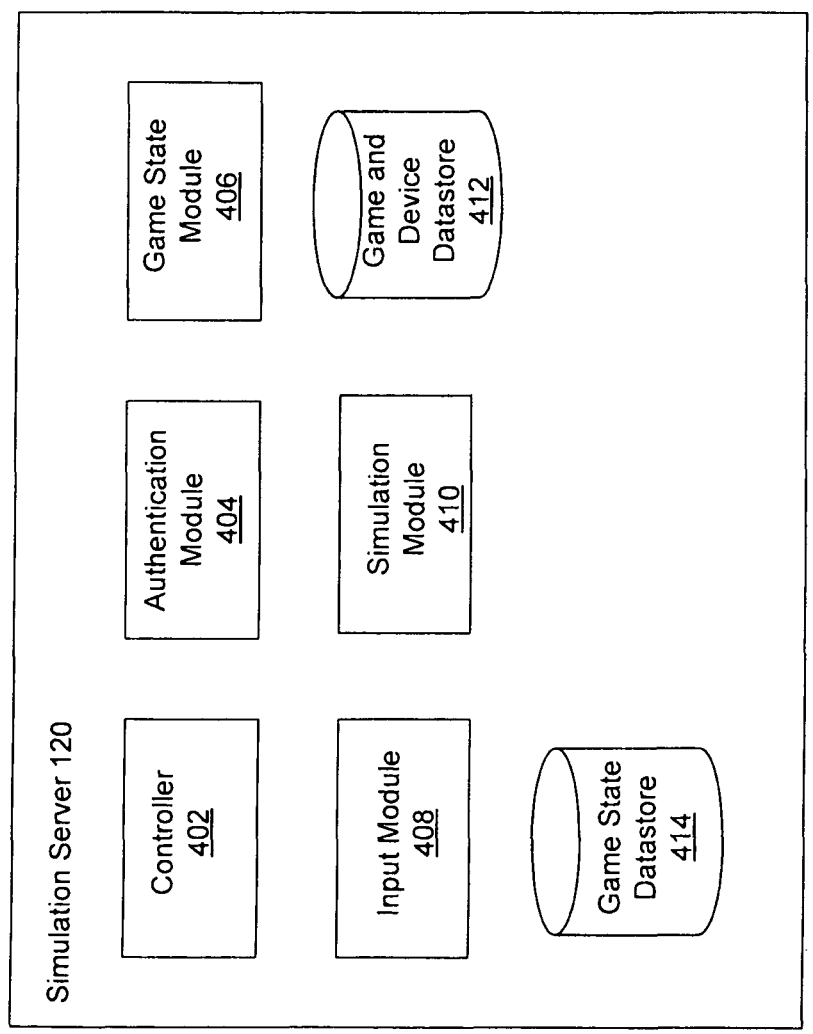
FIG. 4 is a block diagram of a simulation server in some embodiments.

FIG. 4 is a block diagram of a simulation server 120 in some embodiments. The simulation server 120 comprises controller 402, an authentication module 404, a game state module 406, an input module 408, a simulation module 410, a game and device datastore 412, and a game state datastore 414.

The controller 402 may control one or more modules and/or datastore(s) of the simulation server 120. In various embodiments, the simulation server 120 may provide simulation results for different games. The controller 402 may be configured to identify a player's game, retrieve game rules (e.g., from the game and device datastore 412) determine if the player's game is a multiplayer game, receive one or more user inputs, determine when sufficient user input(s) are received, receive or maintain at least one current game state associated with the identified game, select an appropriate simulation for the game(s) being played (e.g., a simulation based on the identified game rules), execute the selected simulation based on user input(s) and/or current game state, update the game state based on simulation results, and provide simulation results and/or the updated game state for rendering.

Different processing servers 118, simulation servers 120, and rendering servers 122 may provide services for different games. In some embodiments, when a user activates a game on a user device, the user device may communicate with a processing server 118. The processing server 118 may identify the user device, player, and/or the activated game. Based on the user device, player, and/or activated game, the processing server 118 may provide simulation serves (e.g., perform simulations and provide results), render video and/or images, or direct communication to one or more different processing servers 118 which may provide services (e.g., simulations and/or rendering) for the activated game, user device and/or player. The different processing server 118 may communicate directly with the user device.

In various embodiments, a central communication server initially communicates with the user device and identifies the user device, player, and/or the game. The central communication server may direct communication between the user device and one or more processing servers 118 based on the user device, player, and/or the game (e.g., different processing servers 118 may provide simulation and/or rendering services to different games or sets of different games). In some embodiments, different processing servers 118 may also provide different services to different game types. For example, a first processing server 118 may provide simulation and/or rendering for a single player version of a game while another processing server 118, either alone or in combination with the first processing server 118, may provide simulation and/or rendering for a multiplayer version of the same game.

The authentication module 404 may authenticate a user device, other simulation servers, other processing servers, and/or one or more rendering servers. In one example, when a player initiates game on user device 106, the user device 106 establishes communication with the processing server 118. In some embodiments, the controller 402 may confirm that the processing server 118 provides services to the user device, player, and/or the activated game. The controller 402 may direct the user device and/or another processing server 118 to perform all or some services based on the user device, player, and/or the activated game.

The authentication module 404 may be configured to authenticate the user device 106, establish a game play session, and/or identify the associated hardware of the player. In some embodiments, based on the hardware of the player and the type of game (e.g., multiplayer, single player, single viewpoint, and/or multiple viewpoints), the controller 402 may direct simulations and/or renderings to be performed in different manners. For example, if the user device is a console (e.g., user device 106), the controller 402 may direct simulations and/or renderings to be performed by the user device which may have sufficient resources. Alternately, the controller 402 may direct simulations and/or renderings to be performed by the user device or the processing server 118 either alone or in combination with other processing servers 118 and/or the user device.

In various embodiments, the authentication module 404 may authenticate communication with the user device (e.g., authenticate the user device, the game, and/or the player). The authentication module 404 may confirm codes, encryption keys, or the like. In some embodiments, the authentication module 404 authenticates the software of the game to prevent unauthorized use and/or unauthorized copies.

The game state module 406 may retrieve a game state associated with the activated game. In some embodiments, the game state module 406 may retrieve a game state from a game state datastore 414 or from the user device. In some embodiments, the game state module 406 provides the game state to the user device and the user device may then provide user interfaces to a player requesting input and/or selection(s) associated with the game.

The game state module 406 may maintain a current state of game play. Based on simulation results from the simulation module 410 and/or selection(s) received from the user, the game state module 406 may update the current game state to a new game state. The updated game state may subsequently be provided, in some embodiments, to one or more other processing servers 118, rendering servers 122, or user devices. In various embodiments, game states are not provided between devices but rather the game state is individually updated on each device.

The input module 408 is configured to receive user input from any number of user devices. In various embodiments, the controller 402 retrieves input instructions regarding the game from any number of user devices and/or the game and device datastore 412. The input instructions may indicate a quantity and/or quality of expected inputs from any number of the user devices. In some embodiments, the input instructions may indicate that required number of user devices that must provide instructions before a simulation may be performed (e.g., input must be received from two user devices for a two-player game). The input module 408 may receive the inputs and determine if the game instructions are satisfied.

In some embodiments, the game state module 406 and/or the input module 408 may update a current game state based at least in part on the user inputs.

The simulation module 410 may perform different simulations based on the game and/or type of game (e.g., based on game rules). In some embodiments, once the required quantity and/or quality of inputs are received, the simulation module 410 may perform a simulation of the game to determine a simulation result. The simulation may be based on the current game state, inputs received from the user devices, and/or simulation instructions from the game and device datastore 412 that are associated with how the simulation is to be performed for the desired game.

In various embodiments, the game state module 406 may update the current game state based at least in part on the simulation result from the simulation module 410. All or part of the new current game state may be provided to the user devices(s) which may provide different user interfaces and/or requests for selection to continue gameplay. In some embodiments, the game state module 406, instead of or in addition to the current game state, the game state module 406 may provide instructions to the user devices to obtain new user input (e.g., menu identifiers and/or requests for information).

The controller 402 may provide the simulation results and/or the current game play state to the rendering server 122, the user device, and/or any digital device. In various embodiments, one or more digital devices may render video and/or images based on the simulation results. For example, a rendering server 122 may perform multiple renderings based on different viewpoints and provide each user device different video and/or images based on the multiple renderings. In another example, a user device may perform a rendering based on the simulation result for the local player while the rendering server 122 may perform a rendering that generates the same video to provide to one or more different user devices to allow other players to view a game. Those skilled in the art will appreciate that any number of digital devices (e.g., user devices and/or rendering servers 122) may render the same or different video and/or images based on the simulation result.

The game and device datastore 412 and the game state datastore 414 may be one or more different data structures including, for example, tables, databases, or the like. The game and device datastore 412 may comprise information that may be used to identify a user device, a game, information to assist in the authentication process, and/or information to assist in the simulation process. The game state datastore 414 may comprise information of an initial game state associated with a game, updated game states, past game states, and/or current game states.

Those skilled in the art will appreciate that the simulation server 120 may comprise any number of modules. For example, some modules may perform multiple functions. Further, in various embodiments, multiple modules may work together to perform one function. In some embodiments, the simulation server 120 may perform more or less functionality than that described herein.

It will be appreciated that a "module" as referred to herein may comprise software, hardware, firmware, and/or circuitry. In one example, one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments.

Figure 5:
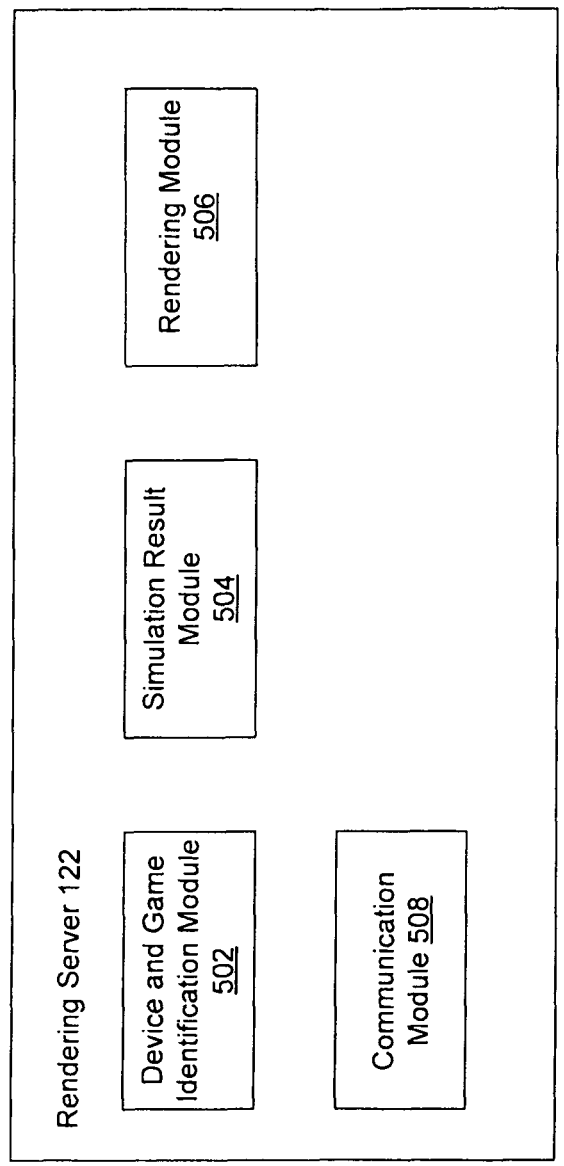
FIG. 5 is a block diagram of a rendering server in some embodiments.

FIG. 5 is a block diagram of a rendering server 122 in some embodiments. The rendering server 122 comprises a device and game identification module 502, a simulation result module 504, a rendering module 506, and a communication module 508. The rendering server 122 may be a part of the processing server 118. The rendering server 122 may, in some embodiments, be a digital device that is remote from the simulation server 120.

The device and game identification module 502 may be configured to provide information regarding the game being played by one or more user devices as well as the characteristics (e.g., hardware and/or software resources) of the user devices (e.g., user device capability information). In one example, the rendering server 122 may render video for a first user device with a large, high resolution screen based on information from the device and game identification module 502. The rendering server 122 may also render video for a portable digital device with a relatively small display and limited resolution. In some embodiments, the rendering server 122 may provide game display information including information to assist a receiving user device to render gameplay (e.g., video and/or images).

The device and game identification module 502 may identify players, user devices, and games based on information from the user device, information from the simulation serve 120, or accounts associated with players, user devices, and/or active games.

The simulation result module 504 may receive the simulation result from the simulation server 120. The rendering module 506 may render view and/or images based on the simulation result from the simulation result module 504 and/or the simulation server 120.

In various embodiments, the device and game identification module 502 indicates different viewpoints that a single player may wish to access. The device and game identification module 502 may identify available viewpoints and/or perspectives based on the game and/or input from the player(s) (e.g., from the user devices). Based on information from the device and game identification module 502, the rendering module 506 may, based on the simulation result, separately render multiple videos and/or images to be shared with one or more user devices. In this example, it will be appreciated that different video may be separately rendered based on the same input without impacting resources of the user device(s). In another example, the rendering module 506 may render some information and provide the rendered information to a user device which may further render (e.g., finish rendering) video and/or images based, in part, on the information from the rendering module 506.

In another example, the device and game identification module 502 may receive player preferences from the user device indicating one or more preferred viewpoints and/or perspectives. The rendering module 506 may, based on the simulation result and the preferences of the player, render view from the identified preferred viewpoints and/or perspectives. The rendering module 506 may, based on the simulation results and the preferences of the player, provide game display information from the identified preferred viewpoints and/or perspectives. The receiving user device may utilize the game display information to render or finish rendering game play.

In some embodiments, the device and game identification module 502 may also track perspectives of different players in a multiplayer game. For example, each user device may provide one or more expected video perspectives. The rendering module 506 may render video and/or images or provide game display information based on the needed perspectives.

The communication module 508 may direct the correct game display information, rendered videos and/or images to different user devices. For example, in multiplayer games, the communication module 508 will track each player's desired perspective(s) and provide the correct rendered video.

Those skilled in the art will appreciate that the rendering server 122 may comprise any number of modules. For example, some modules may perform multiple functions. Further, in various embodiments, multiple modules may work together to perform one function. In some embodiments, the rendering server 122 may perform more or less functionality than that described herein.

Figure 6:
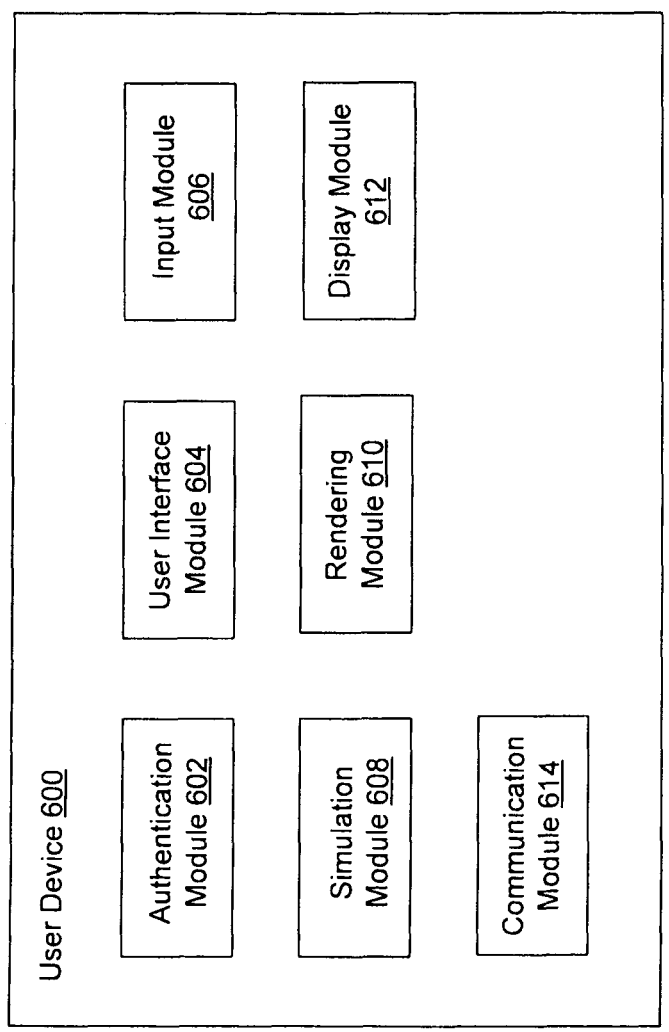
FIG. 6 is a block diagram of a user device in some embodiments.

FIG. 6 is a block diagram of a user device 600 (e.g., user devices 104, 106, 108, 110, 112, 114, and/or 116) in some embodiments. The user device 600 comprises an authentication module 602, a user interface (UI) module 604, an input module 606, a simulation module 608, a rendering module 610, a display module 612, and a communication module 614.

In various embodiments, the authentication module 602 communicates with the processing server 118. The authentication module 602 may communicate with the processing server 118 via the communication network 102 when the user device 600 accesses a game, access the communication network 102, or upon command by the player.

The authentication module 602 may authenticate communication with the processing server 118. The processing server 118 may confirm that the user device 600 is authorized to play the game and/or receive services. The processing server 118 may also receive information regarding the hardware of the user device 600, identify hardware specifications (e.g., size and resolution of the display, processor, and/or available memory). In some embodiments, the user device 600 authenticates the server.

The user interface module 604 may provide one or more interfaces to the player. The interface may include menus or any functional objects which the player may use to provide input (e.g., indicate player preferences for the next play or game conditions). In various embodiments, the user interface module 604 generates menus and/or functional objects based on game rules and/or the current user state. For example, the game rules and/or the current user state may trigger one or more menus and/or fields to request information from the player (e.g., to identify the next play).

The input module 606 may receive the input from the user interface module 604. Input may include play selections, player choices, text, control executions (e.g., keyboard entry, joystick entry, or the like). In various embodiments, the input module 606 may provide input to the processing server 118.

The simulation module 608 may generate simulation results based on the user input, game rules, and/or the current game state. The game rules may indicate the simulation to execute while the current game state and the user input may provide parameters which may affect the simulation result. In some embodiments, simulation is performed by a processing server 118. In various embodiments, simulation may be performed by a remote digital device such as the simulation server 120 of the processing server 118. In some embodiments, the simulation server 120 generates simulation results for multiple devices.

The rendering module 610 may be configured to render video and/or images. The perspective(s) and/or viewpoint(s) of the rendered video may be identified from the game rules, the user device 600 (e.g., limitations of rendering resources such as limited memory or GPU, size of screen of user device 600, and/or other limitations such as resolution), and user point of view (e.g., based on the player's point of view in the game), and/or player preferences (which may indicate a preference for one or more views over others). In various embodiments, rendering may be performed by a remote digital device such as the rendering server 122 of the processing server 118.

In some embodiments, the rendering module 610 may render video and/or images based, at least in part, on game display information received from the processing server. The game display information may provide instructions or information regarding rendering. In some embodiments, the game display information assists in the rendering of video and/or images such that the resource requirements of the user device 600 for rendering may be reduced.

The display module 612 is configured to display the at least some of the rendered video and/or images. For example, the rendering module 610 may render the simulation results in three different viewpoints. The player, for example, may receive one viewpoint by default and may optionally choose to view the other viewpoints. Alternately, the player may not opt to view the other rendered viewpoints. The display module 612 may comprise, for example, a screen.

The communication module 614 may provide authentication requests, user inputs, game rules, and/or game states to another digital device (e.g., the processing server 118). The communication module 614 may also receive information to perform simulations (e.g., the communication module 614 may receive game state information and/or user inputs from other user devices in a multiplayer game. Further the communication module 614 may receive rendered video from another digital device (e.g., the processing server 118) which may be displayed to the player by the display module 612.

Those skilled in the art will appreciate that the user device 600 may comprise any number of modules. For example, some modules may perform multiple functions. Further, in various embodiments, multiple modules may work together to perform one function. In some embodiments, the user device 600 may perform more or less functionality than that described herein.

Figure 7:
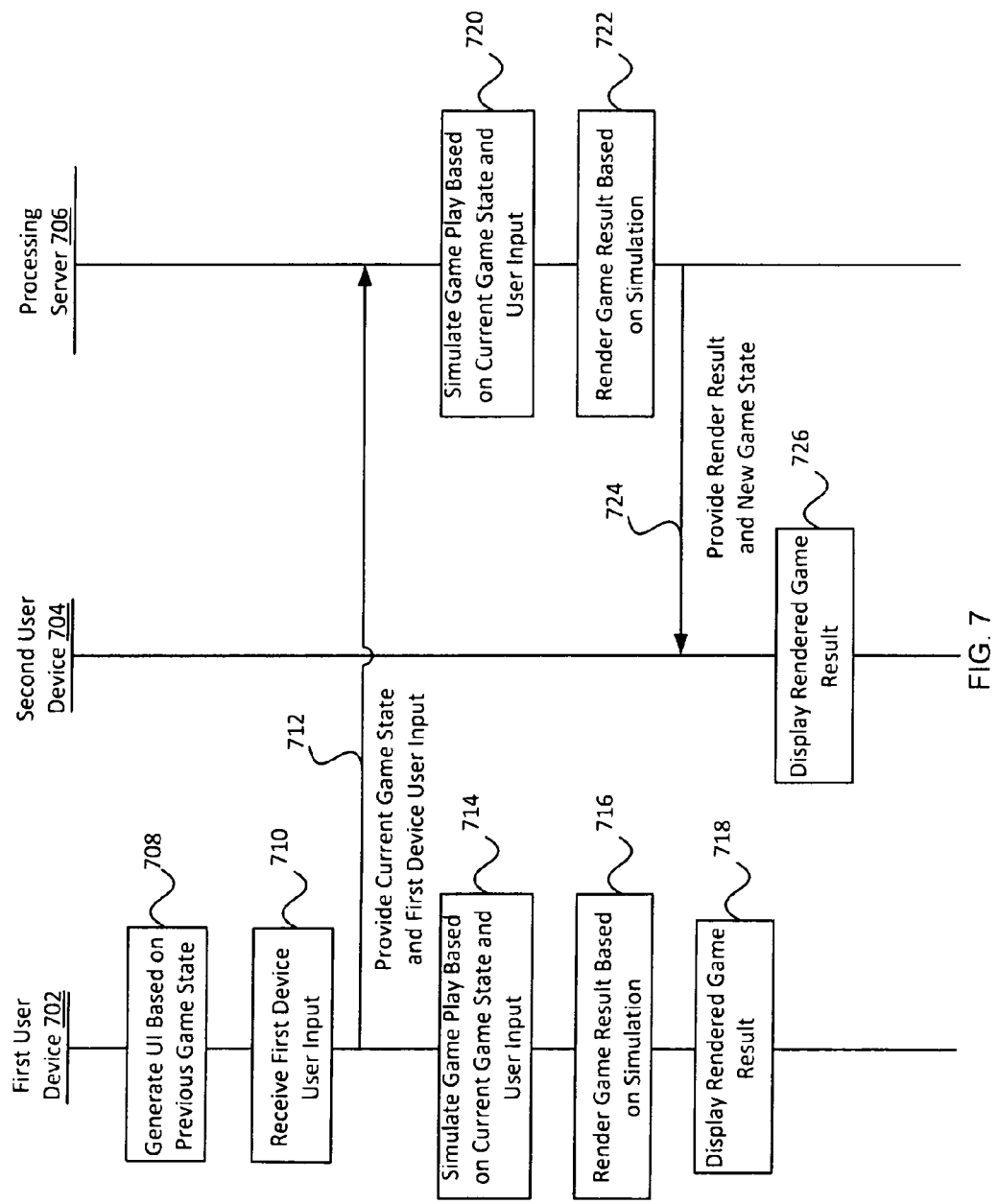
FIG. 7 is a flow diagram for sharing video with multiple devices in some embodiments.

FIG. 7 is a flow diagram for sharing video with multiple devices in some embodiments. In some embodiments, simulation and rendering may be performed by both a user device and at least one remote device such as the processing server. In one example, a game may be deterministic wherein given the same user selection(s) and current game state, multiple simulations provide the same result. As such, the user selection(s), game state, and/or other information may be provided to multiple devices to perform multiple simulations generating the same simulation result and/or render video and/or images. The rendered video and/or images may be based on the simulation result. The rendered video and/or images may be the same on all digital devices. In some embodiments, all or some of the rendered video and/or images may be different (e.g., from different perspectives or viewpoints) even though the video and/or images may capture the same gameplay (e.g., the same simulation result). For example, if two players are playing a football game, the player of the football team playing offense may see a play based on the offensive team's viewpoint while another player of a football team playing defense may see the same play based on the defensive team's viewpoint.

FIG. 7 comprises a first user device 702, a second user device 704, and a processing server 706. In step 708, the first user device 702 generates a user interface based on the previous (or initial) game state and/or game rules. In one example, the user interface module 602 of the first user device 702 displays menus or any other input functionality or fields to request user input (e.g., user selections). The different menus and/or input functionality or fields may be based on the game and/or current game state.

In step 710, the first user device 702 receives first device user input. In one example, the input module 604 of the first user device 702 receives user selection(s).

In step 712, the first user device 702 provides the current game state and/or the first device user input to the processing server 706. In some embodiments, the input module 604 updates the current game state with the first device user input and provides the updated current game state and/or the user input to the processing server 706.

In step 714, the first user device 702 simulates game play based on the current game state and the user input. In various embodiments, the simulation module 610 generates a simulation result based on the current game state and/or user input. The simulation module 610 may also update the current game state based on the simulation result.

In step 716, the first user device 702 renders the simulation result. In one example, the rendering module 612 of the first user device 702 may render the simulation result into multiple videos and/or images (e.g., for different perspectives, viewpoints, or the like).

In step 718, the first user device 702 displays the rendered result (e.g., displays the rendered video(s) and/or image(s)). The first user device 702 may display the result via a display module 614.

Those skilled in the art will appreciate that the first user device 702 may follow game rules thereby allowing another menu and/or other functionality to request additional input from the user to continue gameplay, display events associated with gameplay, provide awards, provide points, award currency, identify winners and/or losers, pause time out, or provide any other functionality as required by the game.

In step 720, the processing server 706 simulates game play based on the current game state and the user input. Those skilled in the art will appreciate that the processing server 706 may perform the same simulation utilizing the same inputs as the first user device 702, and, as a result, the simulation result may be the same as that of the first user device 702. In various embodiments, the simulation module 410 of the simulation server 120 generates a simulation result based on the current game state and/or user input.

The game state module 406 of the simulation server 120 may update the current game state based on the simulation result. In some embodiments, the game state module 406 maintains the updated current game state at the processing server 706. Those skilled in the art will appreciate that the updated current game state at the processing server 706 may be the same updated current game state of the first user device 702.

In step 722, the processing server 706 renders the simulation result. Those skilled in the art will appreciate that the processing server 706 may perform the same rendering utilizing the same simulation result as the first user device 702, and, as a result, the rendered video and/or images may be the same as that of the first user device 702. In some embodiments, the rendering server 122 of the processing server 706 may render the simulation result into multiple videos and/or images (e.g., for different perspectives, viewpoints, or the like).

The processing server 706 and the first user device 702 may perform simulations and/or renderings simultaneously, near simultaneously, or at different times or days.

In step 724, the processing server 706 provides the rendering result and/or the updated current game state to the second user device 704. In step 726, the second user device 704 displays the rendered result (e.g., displays the rendered video(s) and/or image(s)). The second user device 704 may display the result via a display module 614.

Those skilled in the art will appreciate that the displayed video and/or images of the second user device 704 may be the same or different from the video and/or images of the first user device 702.

In various embodiments, by simulating game play and/or rendering video and/or images by multiple remotely located devices, additional players at other digital devices may share (e.g., watch) the game of the player at the first user device 702. Further, other players are not necessarily bound by the same viewpoint as the player at the first user device 702. For example, multiple renderings at different viewpoints can be performed to allow any number of players to view gameplay of the first player without impacting the quality or speed of the game (e.g., the quality or speed of the renderings for the first player). Similarly, others may watch the game at any time.

Further, in various embodiments, game information, user input, and/or game states may be maintained to allow simulations and/or renderings to be performed at any time thereby allowing the game to be recreated at any time for any number of other users or the player if they wish to view past games.

In some embodiments, because game information, user input, and/or game states may be maintained to allow simulations and/or renderings to be performed at any time, players and/or other users may go to any point in a past game or a past point of time in a current game and make different selection(s) to experience different outcomes. In this example, a player may choose to load the game information, user input, and/or game states at a determined point in game play. The player may then make different selections moving forward in game play and continue to play the game based on new selections and the subsequent changes to the simulation, rendering, and game state based on the new selections.

In some embodiments, rather than rendering a game result based on the simulation, the processing server 706 may generate game display information based on the simulation result. The game display information may include any information associated with display of a user device. For example, the game display information may comprise text to be displayed by a user device. The game display information may comprise information to be rendered by the user device, information to assist the user device to render, or may include video and/or images rendered by the processing server 706.

Figure 8:
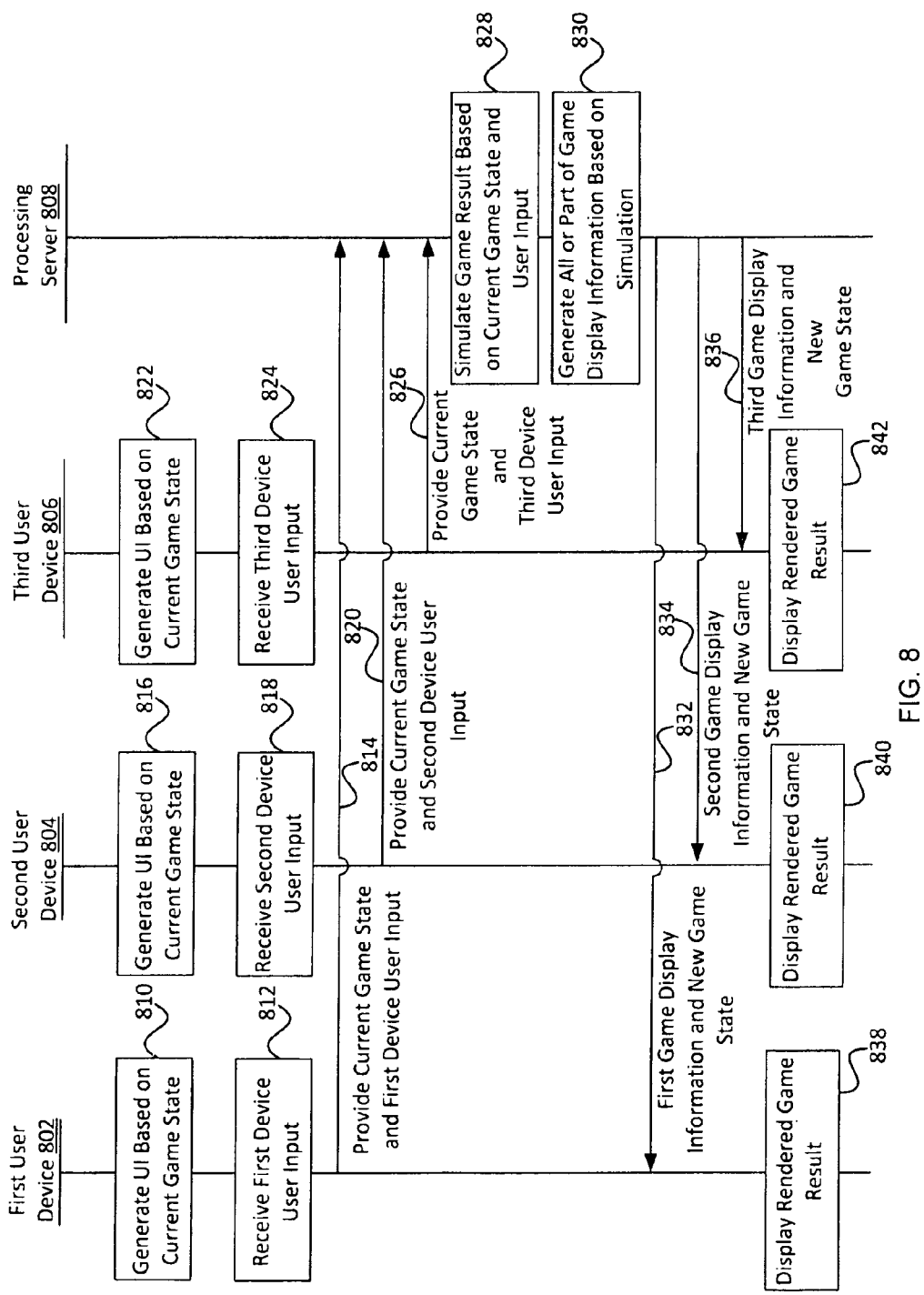
FIG. 8 is a flow diagram for sharing different renderings with different devices in some embodiments.

FIG. 8 is a flow diagram for sharing different renderings with different devices in some embodiments. In some embodiments, simulation and rendering for a multiplayer game may be performed by one or more processing servers 808 and the rendered video and/or images provided to any number of digital devices (e.g., user devices 802, 804, and 806). As similarly discussed regarding FIG. 7, a game may be deterministic wherein given the same user selection(s) and current game state (e.g., game state information), multiple simulations provide the same result. As such, the user selection(s), game state, and/or other information may be provided to a remote device to produce simulation and produce a simulation result. The game may be turn-based. The remote device may also provide different renderings based on the same simulation result. The different video and/or images may be based on different points of view, perspectives, sides played in the game, characters, or the like. In other embodiments, the rendered video and/or images may be the same for all digital devices.

FIG. 8 comprises a first user device 802, a second user device 804, a third user device 806, and a processing server 808. In step 810, the first user device 802 generates a user interface based on the current (or initial) game state. In one example, the user interface module 602 of the first user device 802 displays menus or any other input functionality or fields to request user input (e.g., request user selections). The different menus and/or input functionality or fields may be based on the game rules and/or current game state.

In step 812, the first user device 802 receives first device user input. In one example, the input module 604 of the first user device 802 receives user selection(s). In step 814, the first user device 802 provides the current game state and/or the first device user input to the processing server 808. In some embodiments, the input module 604 updates the current game state with the first device user input and provides the updated current game state and/or the user input to the processing server 808.

Similar to steps 810 and 812, in step 816, the second user device 804 generates a user interface based on the current (or initial) game state. In one example, the user interface module 602 of the second user device 804 displays menus or any other input functionality or fields to request user input (e.g., user selections). The different menus and/or input functionality or fields may be based on the game and/or current game state. In some embodiments, the menus and/or any other input functionality may be similar to that generated in step 810 by the first user device 802.

In step 818, the second user device 804 receives second device user input. In one example, the input module 604 of the second user device 804 receives user selection(s). In step 820, the second user device 804 provides the current game state and/or the second device user input to the processing server 808. In some embodiments, the input module 604 updates the current game state with the second device user input and provides the updated current game state and/or the user input to the processing server 808.

Similarly, in step 822, the third user device 806 generates a user interface based on the current (or initial) game state. In one example, the user interface module 602 of the third user device 806 displays menus or any other input functionality or fields to request user input (e.g., user selections). The different menus and/or input functionality or fields may be based on the game and/or current game state. In some embodiments, the menus and/or any other input functionality may be similar to that generated in step 810 by the first user device 802.

In step 824, the third user device 806 receives third device user input. In one example, the input module 604 of the third user device 806 receives user selection(s).

In step 826, the third user device 806 provides the current game state and/or the third device user input to the processing server 808. In some embodiments, the input module 604 updates the current game state with the third device user input and provides the updated current game state and/or the user input to the processing server 808.

In step 828, the processing server 808 simulates game play based on the current game state and/or the user inputs from the first, second and third user devices 802, 804, and 806. In some embodiments, the processing server 808 maintains a current game state and only receives the user inputs from the other user devices. In various embodiments, one or more of the other user devices provides a current game state to the processing server 808. In some embodiments, each user device 802, 804, and 806 modifies the current game state based on the related player input and provides at least the modified current game state to the processing server 808.

In various embodiments, the simulation module 610 of the processing server 808 generates a simulation result based on the current game state(s), modified game state(s), and/or user inputs from the user devices. The simulation module 610 may also update the game state based at least in part on the simulation result.

In step 830, the processing server 808 generates all or part of game display information based on the simulation. The game display information may comprise video and/or audio and/or may comprise information (which may include video and/or audio) to assist a local device with rendering.

In one example, the rendering module 506 of the processing server 808 may generate first, second, and third game display information for different user devices by rendering at least some of the simulation result into multiple videos and/or images for the different players (e.g., for different perspectives of each player, different viewpoints, or the like). In various embodiments, a rendering server 122 associated with the processing server 808 may receive user device display information from each of the user devices indicating a preference and/or a view point. The rendering server 122 may generate first, second, or third game display information (e.g., render video and/or audio or render information to assist in the rendering of video and/or audio) based at least in part on the preference, view point, and/or user device capability. Further, the rendering sever 122 or rendering modules of the first, second, and/or third devices may render different video and/or provide game display information for each of the user devices 802, 804, and 806. The different video displayed on the user devices 802, 804, and 806 may have different resolutions, screen size, colors, or the like based on the hardware requirements, resources, and/or limitations of the user devices. The resulting appropriate video and/or images may be provided to the respective user device in steps 832, 834, and 836 respectively.

In various embodiments, the processing server 808 provides an updated current game state to each of the user devices. The updated current game state may be the same for each of the user devices. In some embodiments, each of user devices may receive a different current game state depending upon the inputs provided to the processing server 808, the different game states received by the processing server 808 from the user devices, and/or game instructions.

In steps 838, 840, and 842, the first, second, and third user devices 802, 804, and 806 display the respective rendered result (e.g., displays the locally and/or remotely rendered video(s) and/or image(s)) received from the processing server 808. In various embodiments, different players of the different user devices may request and/or receive rendered video and/or images that was provided to other user devices (e.g., one player may request and view a multiplayer game from another player's perspective).

Those skilled in the art will appreciate that each user device may follow game requirements thereby allowing another menu and/or other functionality to request additional input from the user to continue gameplay, display events associated with gameplay, provide awards, provide points, award currency, identify winners and/or losers, pause time out, or provide any other functionality as required by the game.

Those skilled in the art will appreciate that the user devices may display the video and/or images based on the game display information from the processing server 808 simultaneously, near simultaneously, or at different times or days.

Further, in various embodiments, game information (e.g., information regarding game rules), user input, and/or game states may be maintained to allow simulations and/or renderings to be performed at any time thereby allowing the game to be recreated at any time for any number of other users or the player if they wish to view past games.

Although FIG. 8 depicts three user devices 802, 804, and 806 engaging in a multiplayer game, those skilled in the art will appreciate that there may be any number of user devices engaged in any number of single player and/or multiplayer games.

Figure 9:
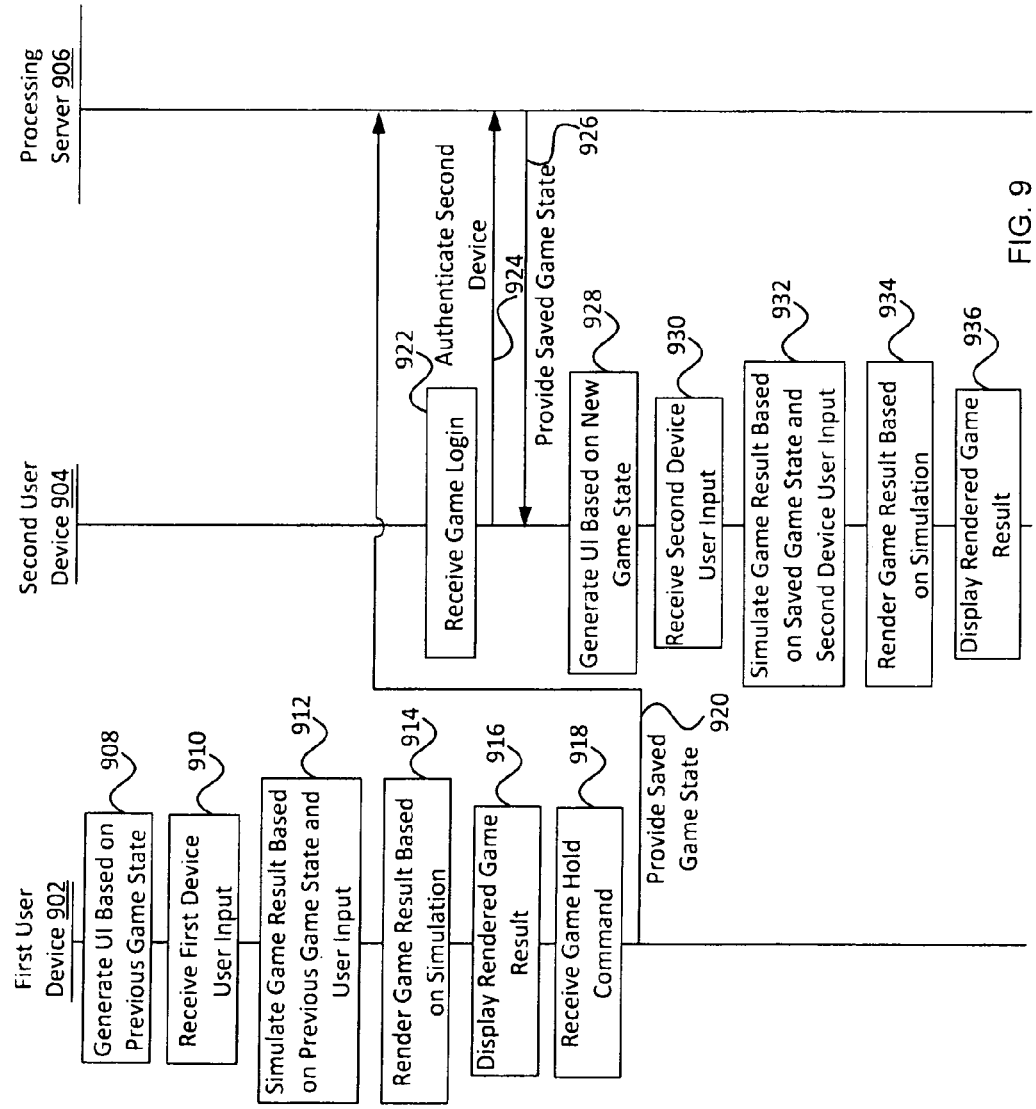
FIG. 9 is a flow diagram for playing a game over different devices in some embodiments.

FIG. 9 is a flow diagram for playing a game over different devices in some embodiments. In some embodiments, simulation and rendering may be performed by both a user device and at least one remote device such as the processing server.

In one example, a game may be deterministic wherein given the same user selection(s) and current game state, multiple simulations provide the same result. As such, a player may begin playing a game on a first user device 902, pause the game, and access the same game on another user device (e.g., second user device 904). Even though the first and second user devices may be different (e.g., the first user device 902 is a console and the second user device 904 is a smartphone), the game state and the simulation result may be the same thereby allowing for a user to pick up where the user left off in a previously saved game, even though the user in on a different device.

FIG. 9 comprises a first user device 902, a second user device 904, and a processing server 906. In step 908, the first user device 902 generates a user interface based on a current (or initial) game state and game rules. In one example, the user interface module 602 of the first user device 902 displays menus or any other input functionality or fields to request user input (e.g., user selections). The different menus and/or input functionality or fields may be based on the game rules and/or current game state. In step 910, the first user device 902 receives first device user input. In one example, the input module 604 of the first user device 902 receives user selection(s).

In step 912, the first user device 902 simulates game play based on the current game state and the user input. In various embodiments, the simulation module 610 generates a simulation result based on the current game state and/or user input. The simulation module 610 may also update the current game state based on the simulation result.

In step 914, the first user device 902 renders the simulation result. In one example, the rendering module 612 of the first user device 902 may render the simulation result into multiple videos and/or images (e.g., for different perspectives, viewpoints, or the like).

In step 916, the first user device 902 displays the rendered result (e.g., displays the rendered video(s) and/or image(s)). The first user device 902 may display the result via a display module 614.

In step 918, the first user device 902 receives a game hold command. A game hold command may be a command from the player of the first user device 902 to pause the game, log out, or otherwise save game play. The command may trigger the first user device to save the current game state and terminate play (e.g., close the game).

In step 920, the first user device 902 provides the current game state to the processing server 906. In some embodiments, the input module 604 updates the current game state with the first device user input and provides the updated current game state and/or the user input to the processing server 906.

In some embodiments, when the first user device 902 initiates the game, the first user device 902 may log into or otherwise be authenticate by the processing server 906. The processing server 906 may identify the first user device 902, the game, and/or the player. When the processing server 906 receives the saved game state, the processing server 906 may save the saved game state.

Although FIG. 9 depicts the current game state being provided to the processing server 906 after the game hold command, those skilled in the art will appreciate that the current game state may be provided to the processing server 906 at any time after the current game state is generated (e.g., after the previous game state was updated with the results from the simulation).

The processing server 906 may associate the updated current game state with the first user device 902, the player, an account associated with the user device 902 and/or the player, the game and/or any other information.

In step 922, the player may access the second user device 904 (e.g., a smartphone) and may access the game (e.g., the second user device 904 logs in the player). In some embodiments, when the second user device 904 receives a game login from the player, the player may provide identify the game to execute as well as request that the game to continue from a previously saved state.

In step 924, the second user device 904 may provide an authentication request to the processing server 906. The authentication request may identify the second user device 904 and the game to continue (e.g., identify the game generally and/or identify the saved state such as the date and time when the game was previously saved). The processing server 906 may authenticate the player, game, and/or the second user device 904.

In some embodiments, the processing server 906 receives a game continuation request that identifies the desired saved game state. Based on information contained within the game continuation request, the processing server 906 may retrieve the saved game state. In some embodiments, the processing server 906 may determine if the second user device 904 has sufficient resources to simulate the game and/or render simulation results. The processing server 906 may identify the hardware of the second user device 904 from the authentication request and/or any other information provided by the second user device 904.

In one example, if the processing server 906 determines that the second user device 904 has sufficient resources for processing and rendering, the processing server 906 may provide the saved game state to the second user device 904. In some embodiments, if the processing server 906 determines that the second user device 904 has insufficient resources for rendering, the simulation may be performed by the processing server 906 or the second user device 904. The simulation result may be provided to the rendering server associated with the processing server 906 to render the video and/or images that are provided to the second user device 904.

In various embodiments, the processing server 906 assumes that the second user device 904 has sufficient resources to simulate and render the video and/or images.

In step 928, once the saved game state is received from the processing server 906, the second user device 904 generates a user interface based on the game state received from the processing server 906 to continue game play. In one example, the user interface module 602 of the second user device 904 displays menus or any other input functionality or fields to request user input (e.g., user selections). The different menus and/or input functionality or fields may be based on the game and/or saved game state. In step 930, the second user device 904 receives second device user input. In one example, the input module 604 of the second user device 904 receives user selection(s).

From the perspective of the player, the player may play the game on the second user device 904 where the player left off when the game was paused by the first user device 902.

In step 932, the second user device 904 simulates game play based on the saved game state and the second user input. In various embodiments, the simulation module 610 of the second user device 904 generates a simulation result based on the current game state and/or user input. The simulation module 610 may also update the current game state based on the simulation result.

In step 934, the second user device 904 renders the simulation result. In one example, the rendering module 612 of the second user device 904 may render the simulation result into multiple videos and/or images (e.g., for different perspectives, viewpoints, or the like).

In step 936, the second user device 904 displays the rendered result (e.g., displays the rendered video(s) and/or image(s)). The second user device 904 may display the result via a display module 614.

Figure 10:
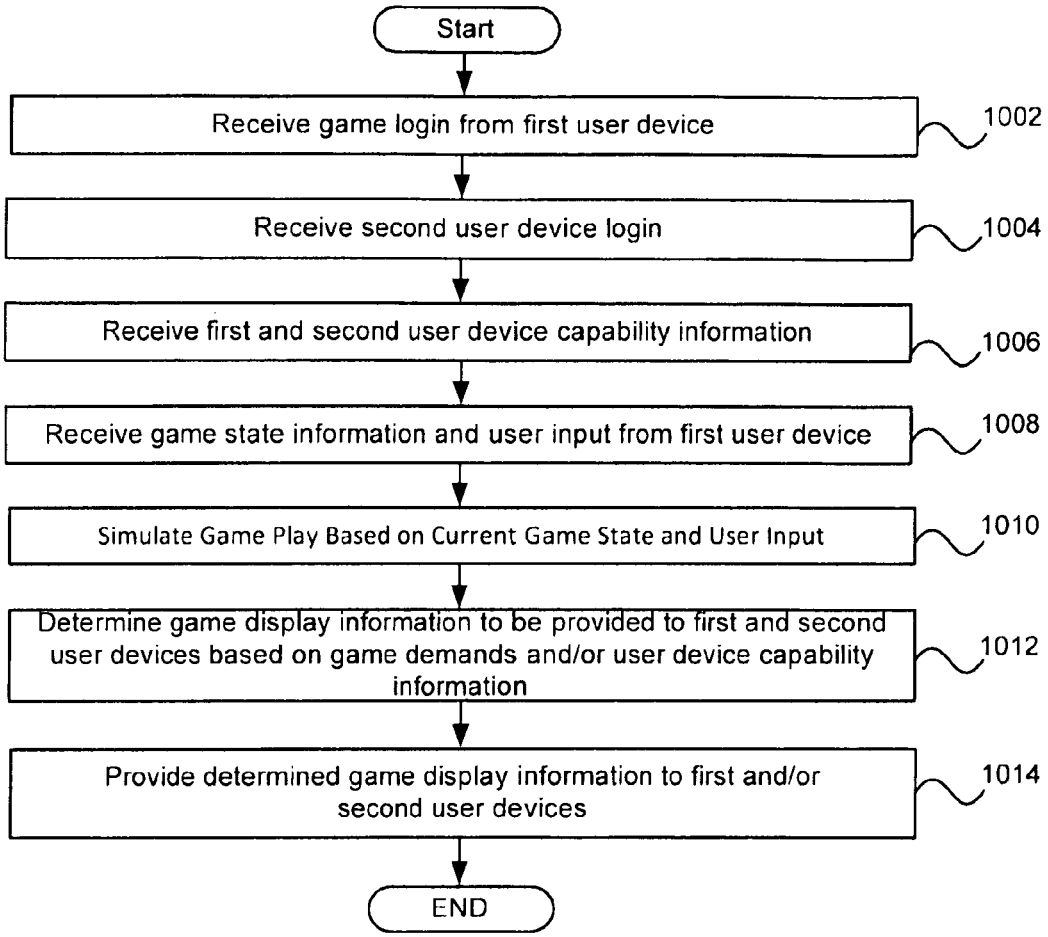
FIG. 10 is a flow chart for determining and providing different game display information to different user devices in some embodiments.

FIG. 10 is a flow chart for determining and providing different game display information to different user devices in some embodiments. The following flow chart is described in the context of FIG. 7. Those skilled in the art will appreciate that the flow chart may comprise any number of user devices and/or processing servers. Further, the process of determining and providing different game display information may be applied in any number of ways including, but not limited to multiplayer sessions (e.g., see FIG. 8) and single player across disparate devices (e.g., see FIG. 9).

In step 1002, a processing server 706 receives a game login from a first user device 702 (see FIG. 7). In various embodiments, when the first user device 702 executes a game, the first user device 702 may communicate with the processing server 706. In one example, the login of the first user device 702 may include an account identifier associated with the game, user, and/or first user device 702. The login of the first user device 702 may also provide a username, password, device identifier, user identifier, or any other information. In some embodiments, the processing server 706 may authenticate the login request and/or confirm the authenticity of the game software associated with the first user device 702.

Those skilled in the art will appreciate that the first user device 702 may not provide a game login or a login request to the processing server 706. Rather, the first user device 702 may provide any information (e.g., account identifier, username, password, device identifier, user identifier, or any other information) to the processing server 706 at any time without providing a game or login request.

In step 1004, the processing server 706 receives a device login from a second user device 704. In some embodiments, the second user device 704 may access the processing server 706 to view gameplay of first user device 702 or participate in a multiplayer game. The second user device 704 login may include an account identifier associated with the game, user, and/or first user device 702. The login of the second user device 704 may also provide a username, password, device identifier, user identifier, or any other information. In some embodiments, the processing server 706 may authenticate the device login.

Those skilled in the art will appreciate that the second user device 704 may not provide a device login or a login request to the processing server 706. Rather, the second user device 704 may provide any information (e.g., account identifier, username, password, device identifier, user identifier, or any other information) to the processing server 706 at any time without providing a game or login request.

In step 1006, the processing server 706 receives first and second user device capability information. Device capability information may be any information regarding the capabilities of one or more user devices. For example, from information received from the first user device 702, the processing server 706 may identify the first user device 702 as a game console (e.g., Xbox) and/or hardware capabilities (e.g., processing capability and rendering capability). Device capability information may include, but is not limited to, screen size, resolution, color depth, rotation, scaling, processor, video card, currently available processing power, RAM, currently available RAM, VRAM, currently available VRAM, rendering capability, operating system, wireless network accessibility, wired network accessibility, cellular accessibility, or the like. Capability information may also comprise a state of the network in communication with a user device such as bandwidth, throughput, and/or quality of service (QoS).

In some embodiments, the processing server 706 may store information (e.g., in a database) identifying at least some device capability information. The processing server 706 may retrieve at least some device capability information from storage based on information from the first user device 702 (e.g., from the game login or information provided by the first user device 702). In another example, the processing server 706 may retrieve at least some device capability information from storage based on information from the second user device 704 (e.g., from the user device login or information provided by the first user device 702). Those skilled in the art will appreciate that all or some device capability information may be provided to the processing server 706 from the first user device 702 and/or the second user device 704.

In step 1008, the processing server 706 receives game state information and user input from the first user device 702. In some embodiments, the in first user device 702 updates the current game state with first device user input and provides the updated current game state and/or the user input to the processing server 706.

In step 1010, the processing server 706 simulates game play based on the current game state and the user input. Those skilled in the art will appreciate that the processing server 706 may perform the same simulation utilizing the same inputs as the first user device 702, and, as a result, the simulation result may be the same as that of the first user device 702. The simulation server 120 may generate a simulation result based on the current game state and/or user input. In various embodiments, the simulation server 120 may update the current game state based on the simulation result.

In step 1012, the processing server 706 determines game display information to be provided to the first and second user devices 702 and 704 based on game demands and/or user device capability information. In various embodiments, the rendering server of the processing server 706 makes the determination. The rendering server may make the determination for each device by comparing game demands to the user device capability information. If the game demands are low and the user devices are capable of meeting or exceeding the game demands, the rendering server may determine to provide the simulation result and/or updated game state information to the user devices such that the user devices may locally render and/or display game information as required.

Those skilled in the art will appreciate that the processing server 706 may provide a wide range of different game display information to a user device depending on game demands and capabilities of the user device. For example, the processing server 706 may provide text or simple information to the user device if game demands require text or simple information. If the capabilities of a user device may meet some but not all requirements at a desired level of performance, the processing server 706 may provide game display information to reduce resource requirements by the user device (e.g., by providing vector data or the like to assist the user device in rendering). If the capabilities of the user device do not meet the game demands at the desired level of performance, the processing server 706 may determine to render video and/or images to be provided to the user device.

In some embodiments, the rendering server determines game display information based on game demands in view of the simulation result. If the game demands and simulation result indicate that, for example, text or other basic information is to be displayed on one or both user devices, the rendering server may provide the text or other basic information to one or both user devices without rendering video or images. For example, the text or other basic information may be sent as plaintext or a text message.

Game demands may change at different points in the game depending on the game and/or the simulation result. For example, game demands may require simple text to scroll across a display of a user device at one point in time and subsequently require video to display movement of players or the like at another point in time. In some embodiments, the processing server 706 accounts for different game demands during gameplay when determining game display information to be provided to the different user devices.

In some embodiments, if a user device is only able at meeting some game demands but not all, the rendering server may determine to provide assisted rendering wherein game display information provided to the user device may allow for limited local rendering. For example, the rendering server may provide vector and/or quaternion data for device specific rendering of the simulation results by the user device to reduce resources required of the user device to display the game.

In another example, the rendering server may determine from the user device capability information that one or both devices have resources that exceed game demands and, as such, one or both user devices may be provided updated game state information and/or the simulation result to allow each user device to locally render game display information (e.g., video and/or audio) based on the simulation result and/or updated game state.

In step 1014, the rendering server provides the determined game display information to the first and/or second user devices 702 and 704. In various embodiments, the processing server 706 provides the updated game state to the first and/or second user devices 702 and 704. The processing server 706 may also provide the simulation result to the first and/or second user devices 702 and 704.

Figure 11:
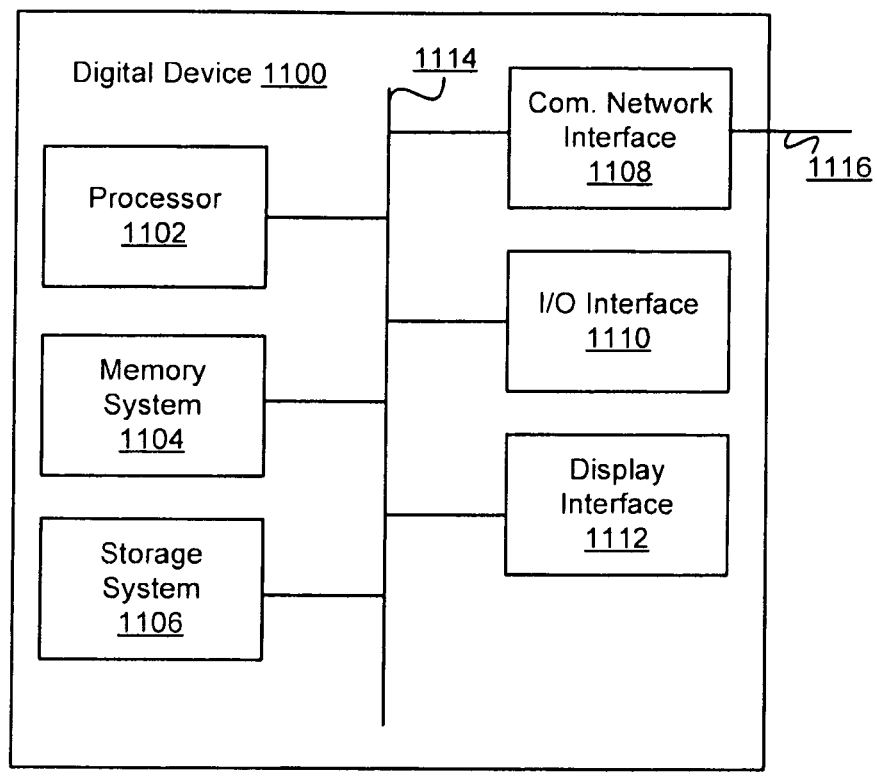
FIG. 11 is a block diagram of an exemplary digital device.

FIG. 11 is a block diagram of an exemplary digital device 1100. The digital device 1100 comprises a processor 1102, a memory system 1104, a storage system 1106, a communication network interface 1108, an I/O interface 1110, and a display interface 1112 communicatively coupled to a bus 1114. The processor 1102 is configured to execute executable instructions (e.g., programs). In some embodiments, the processor 1102 comprises circuitry or any processor capable of processing the executable instructions.

The memory system 1104 is any memory configured to store data. Some examples of the memory system 1104 are storage devices, such as RAM or ROM. The memory system 1104 can comprise the ram cache. In various embodiments, data is stored within the memory system 1104. The data within the memory system 1104 may be cleared or ultimately transferred to the storage system 1106.

The storage system 1106 is any storage configured to retrieve and store data. Some examples of the storage system 1106 are flash drives, hard drives, optical drives, and/or magnetic tape. In some embodiments, the digital device 1100 includes a memory system 1104 in the form of RAM and a storage system 1106 in the form of flash data. Both the memory system 1104 and the storage system 1106 comprise computer readable media which may store instructions or programs that are executable by a computer processor including the processor 1102.

The communication network interface (com. network interface) 1108 can be coupled to a network (e.g., communication network 102) via the link 1116. The communication network interface 1108 may support communication over an Ethernet connection, a serial connection, a parallel connection, or an ATA connection, for example. The communication network interface 1108 may also support wireless communication (e.g., 802.11 a/b/g/n, WiMax). It will be apparent to those skilled in the art that the communication network interface 1108 can support many wired and wireless standards.

The optional input/output (I/O) interface 1110 is any device that receives input from the user and output data. The optional display interface 1112 is any device that is configured to output graphics and data to a display. In one example, the display interface 1112 is a graphics adapter. It will be appreciated that not all digital devices 1100 comprise either the I/O interface 1110 or the display interface 1112.

It will be appreciated by those skilled in the art that the hardware elements of the digital device 1100 are not limited to those depicted in FIG. 11. A digital device 1100 may comprise more or less hardware elements than those depicted. Further, hardware elements may share functionality and still be within various embodiments described herein. In one example, encoding and/or decoding may be performed by the processor 1102 and/or a co-processor located on a GPU (i.e., Nvidia).

Figure 12:
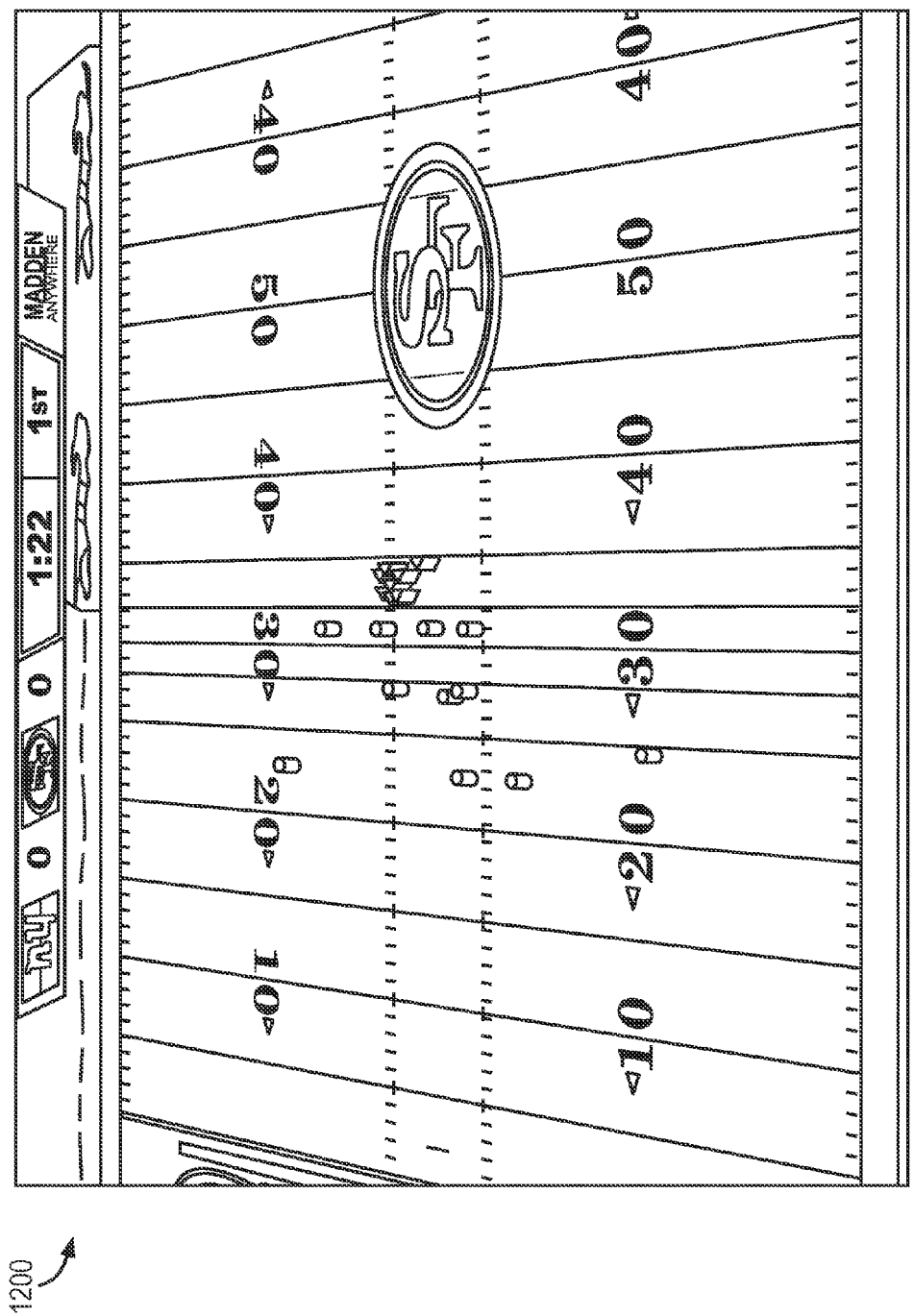
FIG. 12 is an exemplary screen shot of a football game wherein players on offense are represented as round or circular while players on defense are represented as arrows.

FIG. 12 is an exemplary screen 1200 shot of a football game wherein players on offense are represented as round or circular while players on defense are represented as arrows. In various embodiments, a game may be displayed in many different ways. The game display for the same game may be different on different digital devices based on hardware capability (e.g., screen size, resolution, color depth, processing power, graphic rendering capability, network access, and/or bandwidth), user preferences (e.g., user selections of different ways to view the game), and game instant (e.g., point in the game which may allow for graphic representations of a summary of a drive or animation of players involved in the execution of individual plays).

In some embodiments, the processing server determines game display information to be provided to a user device. The determination may be based on hardware capability as well as game demands. If the game demands may prefer that players be animated at a point in the game but allow for assisted rendering or different actions should hardware capability be at or below game demands. For example, the processing server may determine to represent players as objects (e.g., circles and arrows) if the hardware capability of the user device (e.g., processing and rendering power of a smartphone) is limited. The processing server may subsequently provide the user device with game display information consistent with the determination. If a different user device is also sharing the same game experience and the different user device has significant hardware capabilities (e.g., the different user device is a console such as a Sony PlayStation), the processing server may provide game display information which allows rendering of animated players at the different user device. As a result, the different user device may have a different visual display of the game than other user devices viewing the same game.

Figure 13:
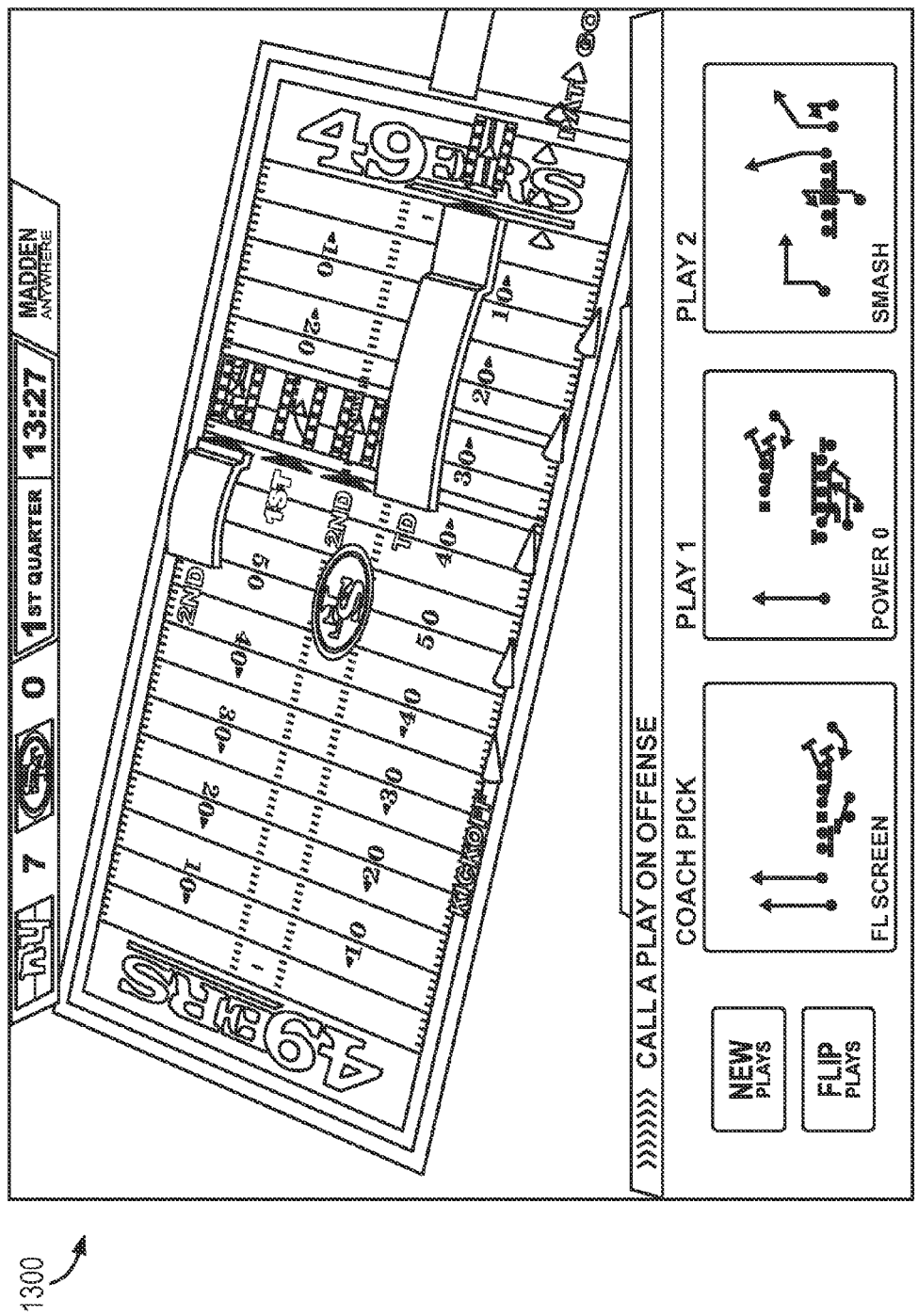
FIG. 13 is an exemplary screen shot of a perspective view of a football game wherein offensive drives are represented with graphics and video of plays may be accessed.

FIG. 13 is an exemplary screen shot 1300 of a perspective view of a football game wherein offensive drives are represented with graphics and video of plays may be accessed. In the exemplary screen shot 1300, users may interact with different elements (e.g., click on a video element) to produce different effects (e.g., view rendered video of a play). In various embodiments, a wide variety of different graphical events may be depicted based, in part, on the hardware capability of the displaying user device. A user device with limited hardware capability may limit interactive elements (e.g., not provide video elements). In some embodiments, the video elements are links to video rendered by the user device (e.g., assisted by the game display information from the processing server) or rendered by the processing server.

In some embodiments, exemplary screen shot 1300 displays options for offensive plays which may allow for users to provide user inputs. The selection may be provided for simulation for the next play.

Figure 14:
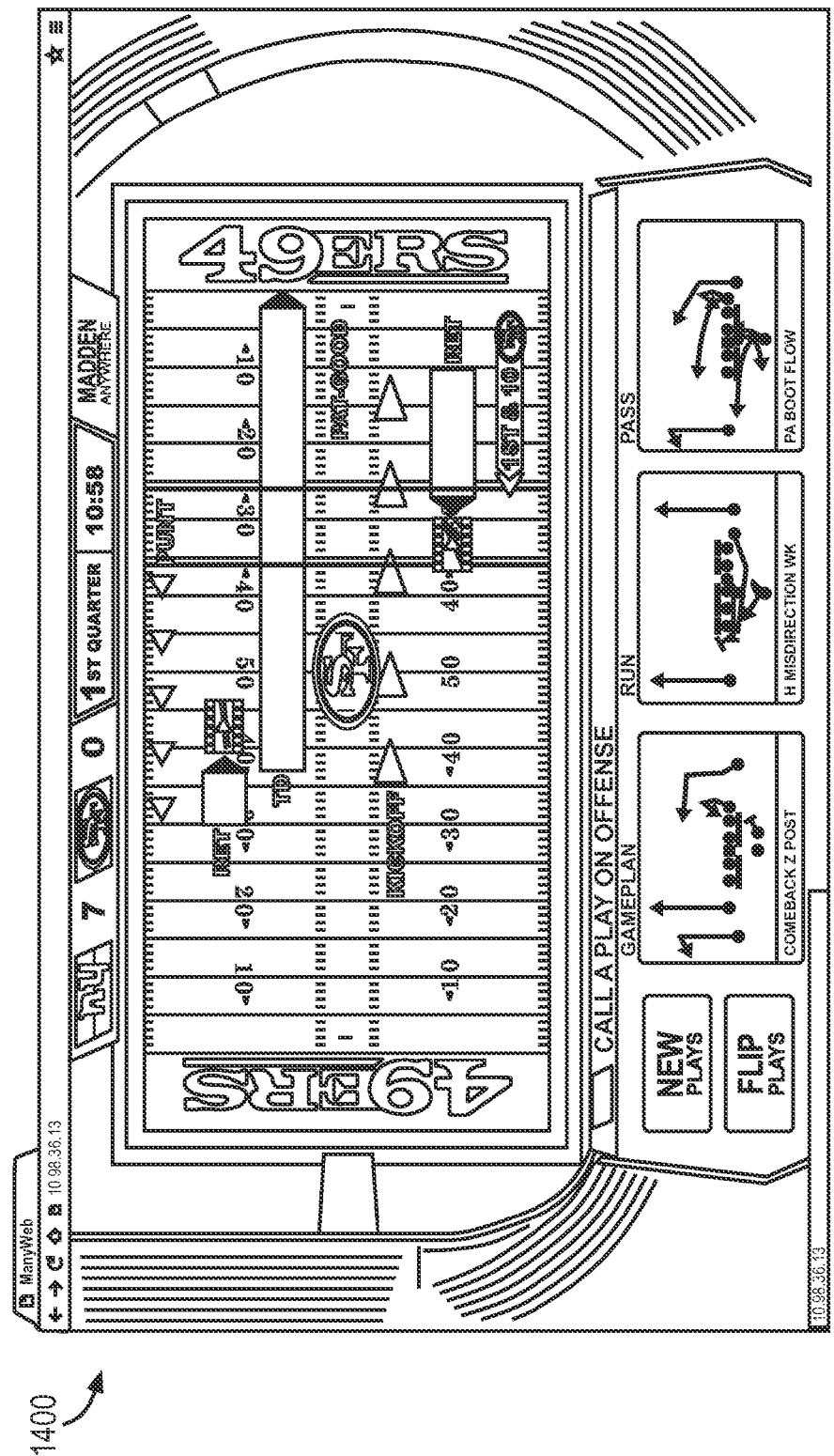
FIG. 14 is another exemplary screen shot of a view of a football game wherein offensive drives are represented with graphics and video of plays may be accessed.

FIG. 14 is another exemplary screen shot 1400 of a view of a football game wherein offensive drives are represented with graphics and video of plays may be accessed. In various embodiments, different user devices may present the same game in different ways. For example, a user device with limited display capability may display the exemplary screen shot 1400 while another user device with more robust display capability may display the perspective view as depicted in exemplary screen shot 1300.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A system comprising:
   first game state information;
   a first user interface module on a first user device, the first user interface module configured to generate first user game input options associated with gameplay of a multiplayer game based on the first game state information, the first user interface module further configured to present the first user game input options to a first player associated with the first user device, the first user interface module further configured to receive a first user selection associated with one or more of the first user game input options;
   a second user interface module on a second user device, the second user interface module configured to generate second user game input options associated with gameplay of the multiplayer game based on the first game state information, the second user interface module further configured to present the second user game input options to a second player associated with the second user device, the second user game input options being different than the first user game input options, the second user interface module further configured to receive a second user selection associated with one or more of the second user game input options; and a processing server including:

a communication module configured to receive the first and second user selections from the first and second user devices, respectively;

a simulation module configured to generate simulation results based on the first game state information, game rules, and the first and second user selections; and a rendering module configured to perform multiple first renderings based on the simulation results and separately perform multiple second renderings based on the simulation results, the multiple first and multiple second renderings being rendered independent of each other, the multiple first and multiple second renderings to be displayed by the first and second user devices, respectively, wherein the first user device and the processing server are configured to split processing resources whereby the first user interface module generates the first user game input options, and the processing server performs the multiple first renderings subsequent to receiving the first user selection from the first user device and the second user selection from the second user device, wherein the second user device and the processing server are configured to split processing resources whereby the second user interface module generates the second user game input options, and the processing server performs the multiple second renderings subsequent to receiving the first user selection from the first user device and the second user selection from the second user device, wherein a perspective among multiple perspectives of the multiple first renderings is identified for rendering based on rendering resources associated with the first user device, or a perspective among multiple perspectives of the multiple second renderings is identified for rendering based on rendering resources associated with the second user device, and wherein each of the multiple first renderings and each of the multiple second renderings are videos.

2. The system of claim 1, wherein the perspective of the multiple first renderings is from a perspective of the first player and the perspective of the multiple second renderings is from a perspective of the second player.

3. The system of claim 1, wherein the game is turn based.

4. The system of claim 1, wherein the multiple first and multiple second renderings are similar.

5. The system of claim 1, wherein the first user interface module is further configured to generate the first user game input options in at least one menu to the first player based on the first game state information and the game rules.

6. The system of claim 1, wherein the simulation module of the processing server is further configured to generate second game state information based on the simulation results.

7. The system of claim 6, wherein the communication module of the processing server is further configured to provide updated game state information to the first and second user devices.

8. The system of claim 7, wherein the first and second user interface modules on the first and second user devices are each further configured to generate a menu to receive user input based on the second game state information and the game rules, the menu generated by the first user interface module including information different than the information included in the menu generated by the second user interface module.

9. A system comprising:

first game state information; and a processing server including:

a communication module configured to receive first and second user selections from a first user interface module on a first user device and a second user interface module on a second user device, respectively, the first user interface module configured to generate first user game input options associated with gameplay of a multiplayer game based on the first game state information, the first user interface module further configured to present the first user game input options to a first player associated with the first user device, the first user interface module further configured to receive the first user selection associated with one or more of the first user game input options, the second user interface module configured to generate second user game input options associated with gameplay of the multiplayer game based on the first game state information, the second user interface module further configured to present the second user game input options to a second player associated with the second user device, the second user game input options being different than the first user game input options, the second user interface module further configured to receive the second user selection associated with one or more of the second user game input options;

a simulation module configured to generate simulation results based on the first game state information, game rules, and the first and second user selections; and a rendering module configured to perform multiple first renderings based on the simulation results and separately perform multiple second renderings based on the simulation results, the multiple first and multiple second renderings being rendered independent of each other, the multiple first and multiple second renderings to be displayed by the first and second user devices, respectively, wherein the first user device and the processing server are configured to split processing resources whereby the first user interface module generates the first user game input options, and the processing server performs the multiple first renderings subsequent to receiving the first user selection from the first user device and the second user selection from the second user device, wherein the second user device and the processing server are configured to split processing resources whereby the second user interface module generates the second user game input options, and the processing server performs the multiple second renderings subsequent to receiving the first user selection from the first user device and the second user selection from the second user device, and wherein a perspective among multiple perspectives of the multiple first renderings is identified for rendering based on rendering resources associated with the first user device, or a perspective among multiple perspectives of the multiple second renderings is identified for rendering based on rendering resources associated with the second user device, and wherein each of the multiple first renderings and each of the multiple second renderings are videos.

10. The system of claim 9, wherein the perspective of the multiple first renderings is from a perspective of the first player and the perspective of the multiple second renderings is from a perspective of the second player.

11. The system of claim 9, wherein the game is turn based.

12. The system of claim 9, wherein the multiple first and multiple second renderings are similar.

13. The system of claim 9, wherein the first user interface module is further configured to generate the first user game input options in at least one menu to the first player based on the first game state information and the game rules.

14. The system of claim 9, wherein the simulation module of the processing server is further configured to generate second game state information based on the simulation results.

15. The system of claim 14, wherein the communication module of the processing server is further configured to provide the second game state information to the first and second user devices.

16. The system of claim 15, wherein the first and second user interface modules on the first and second user devices are each further configured to generate a menu to receive user input based on the second game state information and the game rules, the menu generated by the first user interface module including information different than information included in the menu generated by the second user interface module.

17. A method comprising:
receiving first game state information;
receiving, by a processing server, first and second user selections from first and second user devices, respectively, the first user device configured to generate for first user game input options associated with gameplay of a multiplayer game based on the first game state information, the first user device further configured to present the first user game input options to a first player associated with the first user device and to receive the first user selection associated with one or more of the first user game input options, the second user device configured to generate second user game input options associated with gameplay of the multiplayer game based on the first game state information, the second user device further configured to present the second user game input options to a second player associated with the second user device and to receive the second user selection associated with one or more of the second user game input options, the second user game input options being different than the first user game input options;
generating, by the processing server, simulation results based on the first game state information, game rules, and the first and second user selections;
performing, by the processing server, multiple first renderings based on the simulation results, the multiple first renderings to be displayed by the first user device; and
performing, by the processing server, multiple second renderings based on the simulation results, the multiple second renderings being rendered separate and independent of the multiple first renderings, the multiple second renderings to be displayed by the second user device,
wherein the first user device and the processing server are configured to split processing resources whereby the first user interface module generates the first user game input options, and the processing server performs the multiple first renderings subsequent to receiving the first user selection from the first user device and the second user selection from the second user device,
wherein the second user device and the processing server are configured to split processing resources whereby the second user interface module generates the second user game input options, and the processing server performs the multiple second renderings subsequent to receiving the first user selection from the first user device and the second user selection from the second user device, and
wherein a perspective among multiple perspective of the multiple first renderings is identified for rendering based on rendering resources associated with the first user device, or a perspective among multiple perspective of the multiple second renderings is identified for rendering based on rendering resources associated with the second user device, and
wherein each of the multiple first renderings and each of the multiple second renderings are videos.

18. The method of claim 17, wherein the perspective of the multiple first renderings is from a perspective of the first player and the perspective of the multiple second renderings is from a perspective of the second player.

19. The method of claim 17, wherein the game is turn based.

20. The method of claim 17, wherein the multiple first and multiple second renderings are similar.

21. The method of claim 17, wherein the first user device is configured to receive the first user selection by displaying at least one menu to the first player based on the first game state information and the game rules.

22. The method of claim 17, further comprising generating, by the processing server, second game state information based on the simulation results.

23. The method of claim 22, further comprising providing, by the processing server, the second game state information to the first and second user devices.

24. The method of claim 23, wherein the first and second user devices are each further configured to generate a menu to receive user input based on the second game state information and the game rules, the menu generated by the first user device including information different than information included in the menu generated by the second user device.

25. A non-transitory computer readable medium comprising instructions, the instructions being executable by a processor for performing a method, the method comprising:
receiving first game state information;
receiving, by a processing server, first and second user selections from first and second user devices, respectively, the first user device configured to generate first user game input options associated with gameplay of a multiplayer game based on the first game state information, the first user device further configured to present the first user game input options to a first player associated with the first user device and to receive the first user selection associated with one or more of the first user game input options, the second user device configured to generate second user game input options associated with gameplay of the multiplayer game based on the first game state information, the second user device further configured to present the second user game input options to a second player associated with the second user device and to receive the second user selection associated with one or more of the second user game input options, the second user game input options being different than the first user game input options;

generating, by the processing server, simulation results based on the first game state information, game rules, and the first and second user selections;

performing, by the processing server, multiple first renderings based on the simulation results, the multiple first renderings to be displayed by the first user device; and performing, by the processing server, multiple second renderings based on the simulation results, the multiple second renderings being rendered separate and independent of the multiple first renderings, the multiple second renderings to be displayed by the second user device, wherein the first user device and the processing server are configured to split processing resources whereby the first user interface module generates the first user game input options, and the processing server performs the multiple first renderings subsequent to receiving the first user selection from the first user device and the second user selection from the second user device, wherein the second user device and the processing server are configured to split processing resources whereby the second user interface module generates the second user game input options, and the processing server performs the multiple second renderings subsequent to receiving the first user selection from the first user device and the second user selection from the second user device, and wherein a perspective among multiple perspectives of the multiple first renderings is identified for rendering based on rendering resources associated with the first user device, or a perspective among multiple perspectives of the multiple second renderings is identified for rendering based on rendering resources associated with the second user device, and wherein each of the multiple first renderings and each of the multiple second renderings are videos.

26. The non-transitory computer readable medium of claim 25, wherein the perspective of the multiple first renderings is from a perspective of the first player and the perspective of the multiple second renderings is from a perspective of the second player.

27. The non-transitory computer readable medium of claim 25, wherein the game is turn based.

28. The non-transitory computer readable medium of claim 25, wherein the multiple first and multiple second renderings are similar.

29. The non-transitory computer readable medium of claim 25, further comprising generating, by the processing server, second game state information based on the simulation results.

30. The non-transitory computer readable medium of claim 29, the method further comprising providing, by the processing server, the second game state information to the first and second user devices to enable the first and second user devices to each generate a menu to receive user input based on updated first game state information and the game rules, the menu to be generated by the first user device including information different than information included in the menu to be generated by the second user device.

* * * * *